United States Patent
Russek

(10) Patent No.: US 10,679,255 B2
(45) Date of Patent: Jun. 9, 2020

(54) METHOD, SYSTEM AND SOFTWARE FOR ASSOCIATING ATTRIBUTES WITHIN DIGITAL MEDIA PRESENTATIONS

(71) Applicant: 10Tales, Inc., Menlo Park, CA (US)

(72) Inventor: David J. Russek, Ambler, PA (US)

(73) Assignee: 10Tales, Inc., Menlo Park, CA (US)

( * ) Notice: Subject to any disclaimer, the term of this patent is extended or adjusted under 35 U.S.C. 154(b) by 914 days.

(21) Appl. No.: 14/506,822

(22) Filed: Oct. 6, 2014

(65) Prior Publication Data

US 2015/0058347 A1   Feb. 26, 2015

Related U.S. Application Data

(63) Continuation of application No. 10/819,514, filed on Apr. 7, 2004, now Pat. No. 8,856,030.

(Continued)

(51) Int. Cl.
| | |
|---|---|
| *G06F 16/58* | (2019.01) |
| *G06Q 50/00* | (2012.01) |
| *H04N 21/431* | (2011.01) |
| *H04N 21/45* | (2011.01) |
| *H04N 21/4788* | (2011.01) |
| *H04N 21/81* | (2011.01) |
| *G06F 16/9535* | (2019.01) |
| *G06Q 30/02* | (2012.01) |
| *G06N 20/00* | (2019.01) |
| *G06F 16/28* | (2019.01) |

(Continued)

(52) U.S. Cl.
CPC ....... *G06Q 30/0271* (2013.01); *G06F 16/285* (2019.01); *G06F 16/58* (2019.01); *G06F 16/9535* (2019.01); *G06K 9/00718* (2013.01); *G06N 20/00* (2019.01); *G06Q 30/00* (2013.01); *G06Q 30/0277* (2013.01); *G06Q 50/01* (2013.01); *H04N 21/25883* (2013.01); *H04N 21/4126* (2013.01); *H04N 21/4312* (2013.01); *H04N 21/44218* (2013.01); *H04N 21/4532* (2013.01); *H04N 21/4788* (2013.01); *H04N 21/6125* (2013.01); *H04N 21/812* (2013.01)

(58) Field of Classification Search
CPC combination set(s) only.
See application file for complete search history.

(56) References Cited

U.S. PATENT DOCUMENTS

| | | | |
|---|---|---|---|
| 5,119,474 | A | 6/1992 | Beitel et al. |
| 5,586,967 | A | 12/1996 | Davis |

(Continued)

FOREIGN PATENT DOCUMENTS

| | | | |
|---|---|---|---|
| KR | 20040005422 A | * | 1/2004 |
| WO | WO0177939 A1 | | 10/2001 |

OTHER PUBLICATIONS

Quintana, "Design of an Object-Oriented Multimedia Database for Personalize Multimedia News", Proc. 1996 Canadian Conf. on Electrical and Computer Engg., May 26, 1996 (May 26, 1996)—pp. 282-285, XP002460458, Calgary, Canada.

*Primary Examiner* — Marie P Brady

(57) ABSTRACT

Disclosed are a system, method and software to associate attributes with digital media assets. Digital media contains specific assets, such as images, that can be replaced with other assets. The system, method and software permit the association of attributes with specific assets. The association of attributes and assets enables the provision of content that is enhanced and more impacting for a user.

1 Claim, 25 Drawing Sheets

Related U.S. Application Data

(60) Provisional application No. 60/460,998, filed on Apr. 7, 2003.

(51) Int. Cl.
  *G06Q 30/00* (2012.01)
  *G06K 9/00* (2006.01)
  *H04N 21/258* (2011.01)
  *H04N 21/41* (2011.01)
  *H04N 21/442* (2011.01)
  *H04N 21/61* (2011.01)

(56) References Cited

U.S. PATENT DOCUMENTS

| | | | |
|---|---|---|---|
| 5,604,855 A | 2/1997 | Crawford | |
| 5,625,570 A | 4/1997 | Vizireanu | |
| 5,692,212 A | 11/1997 | Roach | |
| 5,725,472 A | 3/1998 | Weathers | |
| 5,734,795 A | 3/1998 | Rogers | |
| 5,751,953 A | 5/1998 | Shiels | |
| 5,754,787 A | 5/1998 | Dedrick | |
| 5,774,664 A | 6/1998 | Hidary | |
| 5,805,784 A | 9/1998 | Crawford | |
| 5,848,934 A | 12/1998 | Shiels | |
| 5,861,881 A | 1/1999 | Freeman | |
| 5,872,927 A | 2/1999 | Shiels | |
| 5,913,310 A | 6/1999 | Brown | |
| 5,918,603 A | 7/1999 | Brown | |
| 5,935,003 A | 8/1999 | Stephens | |
| 5,945,988 A | 8/1999 | Williams | |
| 5,977,968 A | 11/1999 | Le Blanc | |
| 5,987,415 A | 11/1999 | Breese | |
| 5,999,172 A | 12/1999 | Roach | |
| 6,029,195 A | 2/2000 | Herz | |
| 6,078,936 A | 6/2000 | Martin | |
| 6,088,717 A | 7/2000 | Reed | |
| 6,120,846 A | 9/2000 | Hin | |
| 6,135,944 A | 10/2000 | Bowman | |
| 6,175,772 B1 | 1/2001 | Kamiya | |
| 6,193,014 B1 | 2/2001 | Ark | |
| 6,205,472 B1 | 3/2001 | Gilmour | |
| 6,222,925 B1 | 4/2001 | Shiels | |
| 6,249,780 B1 | 6/2001 | Mizokawa | |
| 6,293,904 B1 | 9/2001 | Blazey | |
| 6,306,077 B1 | 10/2001 | Prab | |
| 6,311,194 B1 | 10/2001 | Sheth | |
| 6,317,127 B1 | 11/2001 | Daily | |
| 6,330,595 B1 | 12/2001 | Ullman | |
| 6,345,288 B1 | 2/2002 | Reed | |
| 6,357,042 B2 | 3/2002 | Srin | |
| 6,421,669 B1 | 7/2002 | Gilm | |
| 6,425,825 B1 | 7/2002 | Sitrick | |
| 6,466,232 B1 | 10/2002 | Newell | |
| 6,499,741 B2 | 12/2002 | Yamazaki | |
| 6,513,011 B1 | 1/2003 | Uwakubo | |
| 6,513,069 B1 | 1/2003 | Abato | |
| 6,520,905 B1 | 2/2003 | Surve | |
| 6,526,395 B1 | 2/2003 | Morris | |
| 6,527,700 B1 | 3/2003 | Manico | |
| 6,529,864 B1 | 3/2003 | Chase | |
| 6,545,209 B1 | 4/2003 | Flannery | |
| 6,581,037 B1 | 6/2003 | Pak | |
| 6,585,521 B1 | 7/2003 | Obrador | |
| 6,591,248 B1 * | 7/2003 | Nakamura | G06Q 30/02 705/14.52 |
| 6,604,091 B2 | 8/2003 | Sadakuni | |
| 7,000,180 B2 | 2/2006 | Balthaser | |
| 7,162,432 B2 | 1/2007 | Mascarenhas | |
| 7,472,110 B2 * | 12/2008 | Achlioptas | G06F 16/9535 |
| 7,483,871 B2 | 1/2009 | Herz | |
| 7,904,922 B1 * | 3/2011 | Haberman | G06Q 10/107 725/35 |
| 8,635,649 B2 | 1/2014 | Ward, III et al. | |
| 2001/0049588 A1 | 12/2001 | Bausch | |
| 2002/0013943 A1 | 1/2002 | Haberman | |
| 2002/0019858 A1 * | 2/2002 | Kaiser | G06O 30/02 709/219 |
| 2002/0074727 A1 * | 6/2002 | Glaser | G09B 23/28 273/429 |
| 2002/0092019 A1 | 7/2002 | Marcus | |
| 2002/0100062 A1 * | 7/2002 | Lowthert | H04N 5/4401 725/136 |
| 2002/0122430 A1 | 9/2002 | Haberman | |
| 2002/0159640 A1 | 10/2002 | Vaithilinga | |
| 2002/0178054 A1 * | 11/2002 | Ader | G06O 30/02 705/14.41 |
| 2003/0001846 A1 * | 1/2003 | Davis | G11B 27/031 345/474 |
| 2003/0001880 A1 | 1/2003 | Holtz et al. | |
| 2003/0009078 A1 | 1/2003 | Fedorovskaya | |
| 2003/0036899 A1 | 2/2003 | Leslie et al. | |
| 2003/0045957 A1 | 3/2003 | Haberman | |
| 2003/0131351 A1 | 7/2003 | Shapira | |
| 2003/0142689 A1 | 7/2003 | Haberman | |
| 2003/0236582 A1 * | 12/2003 | Zamir | G11B 27/002 700/94 |
| 2004/0015608 A1 * | 1/2004 | Ellis | G06Q 30/02 709/246 |
| 2004/0194123 A1 * | 9/2004 | Fredlund | G06Q 30/02 725/9 |
| 2004/0267816 A1 | 12/2004 | Russek | |
| 2008/0120345 A1 * | 5/2008 | Duncombe | G06F 3/0482 |

\* cited by examiner

1101

| USER ID | PASSWORD | E-MAIL |
|---|---|---|
| 372915 | GOFISH | SMITH@ISP.NET |

1111

| USER ID | PROFILE ELEMENT | KNOWN/UNKNOWN | IMPORTANCE |
|---|---|---|---|
| 372915 | ART | KNOWN | MEDIUM |
| 372915 | BIRDS | UNKNOWN | |
| 372915 | APPLIANCES | KNOWN | LOW |

1121

| USER ID | PROFILE ELEMENT | VALUE | RANK |
|---|---|---|---|
| 372915 | ART | ABSTRACT | 3 |
| 372915 | ART | RENAISSANCE | 7 |
| 372915 | APPLIANCES | STOVE | 5 |

*FIG. 11*

FIG. 16   THE DYNAMIC PERSONALIZED CONTENT IS DETERMINED PER USER BASED UPON PROFILES THAT ARE CREATED FROM INTERACTIVE CHOICES.

THE IMI CREATIVE INCLUDES THE BLENDING OF ACTION AS WELL AS IN DIGITAL VIDEO FORM.

GOAL:
INCREASE NARRATIVE IMPACT
PROFILE CLASSIFICATION: NARRATIVE PERCEPTION IDENTIFICATION FRAMEWORK

| COGNITIVE AFFINITIES | EMOTIONAL AFFINITIES | SOCIAL AFFINITIES | SELF-NARRATING SELF MAINTAINING CONTENT | INTERNAL NARRATIVE TRAITS PREFERENCE TOPOLOGY | TIME SENSITIVE / EPISODIC & EXPECTATION SEQUENCING | COLLECTIVE COLLABORATIVE |
|---|---|---|---|---|---|---|
| NOT KNOW | NOT KNOW | NOT KNOW | NO CONTENT | ENGAGER | SEQUENCE ALIGNS (Y/N) WITH CULTURAL PSYCH OR EXPECTATION | SOCIALLY ENGAGED/ DEFINED |
| KNOWN SIGNIFICANT (+ OR − VALENCE) | LOW SIGNIFICANCE | LOW SIGNIFICANCE | APPROPRIATE CONTENT | BYSTANDER | OUTCOMES EXPECTATIONS/ SPEED, MOTION VARIANCE & OUTCOME VARIABLES | NO SOCIAL ENGAGEMENT |
| | MEDIUM SIGNIFICANCE | MEDIUM SIGNIFICANCE | NON-APPROPRIATE CONTENT | IDENTIFIER | | RELEVANCE OF SOCIAL ENGAGEMENT |
| | HIGH SIGNIFICANCE | HIGH SIGNIFICANCE | MEANING OF CONTENT THAT POPULATES OTHER FIELDS (CAPTURED WHEN SUBMITTED) | DETACHER | INTENT VALENCING & INTENT ASSOCIATION | NO CONTENT FROM OTHERS |
| | | ALL ABOVE WITH WHOM | | METAPHORICAL | | APPROPRIATE CONTENT FROM OTHERS (Y/N) |
| | | | | LITERAL | | NON-APPROPRIATE CONTENT FROM OTHERS (Y/N) |

FIG. 23

METHOD, SYSTEM AND SOFTWARE FOR ASSOCIATING ATTRIBUTES WITHIN DIGITAL MEDIA PRESENTATIONS

CROSS-REFERENCE TO RELATED APPLICATIONS

This application is a continuation of and claims priority to U.S. patent application Ser. No. 10/819,514, entitled "Method, System and Software for Associating Attributes within Digital Media Presentations," filed Apr. 7, 2004, which claims priority to U.S. Provisional Application No. 60/460,998 entitled "Method and System for Digital Entertainment Asset Personalization," filed Apr. 7, 2003, which are incorporated herein by reference in their entireties. This patent application is also related to U.S. patent application Ser. No. 10/819,404 entitled "Method, System and Software for Digital Media Narrative Personalization," filed Apr. 7, 2004, which issued as U.S. Pat. No. 8,478,645 on Jul. 2, 2013.

BACKGROUND OF THE INVENTION

It has been stated that human thinking falls into one of two categories: reasoning and narrative, descriptive, contemplative thinking Reasoning is the process that permits the acceptance of facts followed by a logical process to conclude a result, opinion, conclusion or decision. Narrative, descriptive, contemplative thinking corresponds to the storytelling process (including receiving of a story) and the thought processes associated with the reception of a story.

Text and stories (presented in various formats) can also be interpreted at various levels including the literal, ethical, historical and mystical levels. It is generally understood that texts and stories are read and interpreted in different ways including at the different levels. A story or narrative can have different meanings at different levels, different interpretations at different levels, and will be interpreted differently by different individuals at each of the levels. Additionally, an individual, based on their emotional or physical state, may interpret each level of a story differently. A person may react differently to a story based on their current emotional state, which may in fact change while they are receiving the story. In some cases, it may be possible to alter their emotional state while receiving the story to make them more receptive to a particular interpretation at one or more levels.

Advertising is typically a type of narrative in which the advertiser attempts to influence the recipient (viewer, reader, listener) in a way that creates a positive association with a product or in some cases attempts to influence the recipient to purchase the product. Humor is frequently used in advertising because it puts the recipient in a receptive state for a message regarding the product. As such, humor is already used to alter the emotional state of the recipient of the advertising. Such manipulation of the emotional state of the recipient is currently limited to simple manipulation through the presentation of the advertisement (narrative).

With the advent of the digital era, the number of ways to transmit and present advertisements has increased dramatically, with advertising being inserted into Web pages, being displayed as pop-up windows on Web pages, transmitted as streaming media over the Internet, presented as animation over the Internet, and inserted into television streams at central or distributed insertion points. The advent of the digital era also threatens advertising in that viewers can avoid advertisements by stopping pop-up windows, or skipping over the advertisements on a Personal Video Recorder (PVR).

Due to the rapid changes in technology, advertisers are being forced to take new approaches to advertising including product placement, in which products are advertised during an entertainment narrative (e.g. a sit-com) as opposed to in a separate advertisement. Advertisers are also exploring ways to draw viewers (or listeners) to content that is essentially digital media narrative storytelling, typically in the form of music or a short story that would appeal to viewers. What is required are ways to attract individuals to content that is personally more relevant and impactful for them and which may contain an advertising message (in the form of product placement), and have them receive that message in full, as opposed to skipping over all or a portion of the message. It would be an additional benefit to have the ability to understand the individual's likes and dislikes or current mood in order to adapt the message appropriately for the individual at the time that they are receiving it.

Digital media narrative may include content, such as video, audio, and combinations thereof, that is distributed digitally and can be stored digitally. In some instances digital media narrative can be manipulated via computer without human interaction. Digital media narrative includes but is not limited to stories presented over the Internet, modifiable digital video including digital television and streaming media, presentations on web sites including animations, still images, sequences of still images, audio, textual presentations, and combinations of all of the above-mentioned media.

Digital media narrative can be distributed in a multitude of ways, such as broadcasting over cable and satellite, the Internet, or on media such as optical disks (CDs or DVDs). Distribution of digital media narrative is a significant business and involves complex relationships between artists and record labels or film studios, producers, and a complete distribution chain that includes advertising, both in the form of advertising of the content itself as well as sponsored advertising that may be inserted into, or become part of the content such as product placement. Examples of sponsored advertising include the insertion of commercials into recorded materials or the use of sponsor's products (e.g., automobiles) in the narrative.

Digital media narratives may be directed at a segment of the market, but the segment that the digital media narrative material is directed to may be quite large. For example, an artist may create works that appeal to the 18-24 year old age group, but that group can include people with different interests from various countries and different economic classes.

Furthermore, when digital media narratives are used as part of advertising, that digital media narrative and the advertising may be directed at such a large market segment that it is difficult to keep the interest of individuals within that market segment. If a user goes to an Internet web site to view a recording of an artist, and in particular a sponsored work that contains advertising, that work (including the advertising) may be so generic that the user cannot respond to or relate to the work. Additionally, the user may experience different emotional states than another user, or the user may be in an emotional state that is different than the user's emotional state when the user previously viewed the material.

For the foregoing reasons, there is a need for a method, system, and software to enable a distributor of sponsored or un-sponsored digital media narratives to change the content of the digital media narrative based on user demographics, psychodemographics, emotional states, affinities (cognitive, emotional and social), self-narrating content classification, internal narrative traits preference topology, time sensitive, episodic expectation sequencing, and collective/collaborate attributes.

SUMMARY OF THE INVENTION

A method, system and software are presented which allow for customizing and personalizing content based on a combination of the user's demographics, psychodemographics, cognitive states, emotional states, social placement and group interaction dynamics within an online community, and/or affinity for certain content elements (images, sounds, segments, graphics, video, text, dialog), self provided narrating content, internal narrative traits preference topology, and expectation level and temporal spacing of assets within the narrative. In one embodiment, a user selects material for presentation and is presented with the dynamic digital media narrative and optional embedded advertising presented in a customized format that gives the user a personalized experience.

The system, method and software may support product placement type advertising by modifying both the product placement material as well as the narrative surrounding the product placement material. Appropriate advertising may be selected as well as selecting components for the narrative that supports the product placement advertising.

In one embodiment, the user accesses a website containing sponsored material and logs on to that website. Information regarding the demographics, psychodemographics, cognitive states, emotional states, social placement and group interaction dynamics with the online community, and/or affinity for certain content elements of the user is retrieved from storage. If the user is a new user, he or she is asked a series of questions, preferably through a form of media narrative, that would creatively ask the questions, in order to obtain key information that the system would then classify and include into the user's profile. These questions can include yes/no, multiple choice, like/dislikes ratings or any other type of personal assessment or individual and/or group question. Alternatively, the user may interact with the media narrative and the interactions may be used to create a user profile.

In one embodiment, the user requests that the material be played or displayed, and is simultaneously presented with that material and customized personalized graphics and video. In another embodiment, the user can interact with the graphics and video. By making certain choices, a profile of the user can be determined and updated and the content (including background material, primary video, overlay graphics and audio) modified appropriately, thus giving the user an enhanced narrative, and more meaningful and emotionally satisfying experience with respect to the viewed content. In both embodiments, the user profile can then be used to present the most appropriate digital assets to the subscriber, namely those with which the user has the highest affinity, or those which map well to the user's tendencies and temperament, which may be included in the user's internal narrative perception identification framework. The internal narrative perception identification framework may include a collection of attributes, qualities, and measurements regarding the user that allow for matching, correlation and/or selection of digital media assets that are appropriate for that user and the effective communication of the message.

In one embodiment, the user's demographics are used to determine personalized content. Demographics may include, and are not limited to, group affiliations, regional location, sex, sexual preference, age, family situation (married or single, children or no children), race or ethnic background, religion and socio-economic condition. The user's demographics may be used alone, or in combination with the previously discussed techniques, to create the individual internal narrative perception identification framework.

One advantage of an embodiment of the method, system and software presented herein is that the user is presented with an enhanced experience of the creator's content that creates a greater emotional experience for the user and a more impactful narrative. This creates a more receptive state for product placed advertising inserted into the content, for a direct advertisement, or for entertainment containing an advertising message. Another advantage of the method, system and software presented herein is that it allows advertising to be inserted in subtle ways and presented in a context in which users may be able to fully engulf themselves into the lifestyle being positioned and portrayed by the brand. By combining the personalized digital media narrative asset elements with product placement advertising, a more powerful media is created for the advertisers and the artists. Additionally, since users typically volunteer to see the content, including advertising, they are much more likely to be receptive to the message presented, and less likely to skip over or fast-forward through the content including the advertising.

In an alternate embodiment, users are presented with questions or chat like text based opportunities within a narrative to either share the emotional experience with other users or to comment on their own emotional experience. This enables a user to share an experience with friends or acquaintances or allows a user to "sit back and relax" while someone else controls the enhanced experience. In this embodiment, the personalized content is based on the learned social dynamics of the user.

Another embodiment includes a developer toolkit that allows a creative director to create trigger points in the material where digital assets such as overlay graphics, backgrounds, icons, text, sound, and/or product placement images can be inserted into the digital media narrative. The developer toolkit allows the creative director to create a map of the elements of the user's profile and his or her internal narrative perception identification framework topology to digital assets that may be created. The developer toolkit also provides for the ability to insert interactive material such as questions or interactive graphics, allowing for the updating and enhancements of the user profile based on the user's interactions. The toolkit further permits the creative director to create and link the digital assets to the material such that assets for which the user has a high degree of affinity or assets having a highest probability for matching a user's internal narrative perception identification framework topology can be selected at the trigger point.

One advantage of an embodiment of the method, system and software presented herein is that they may enable a central server or service to compile a user's internal narrative perception identification framework and to store the internal narrative perception identification framework as an internal narrative perception identification framework profile and allow this profile to track or follow the user as he or she peruses multiple digital media narratives. This enables the user to receive enhanced digital media assets and various narrative experiences and allows the service to be sold to advertisers that advertise on any web site or broadband IP-based distribution point.

These and other features and objects of the invention will be more fully understood from the following detailed description of the embodiments which should be read in light of the accompanying drawings.

In this respect, before explaining at least one embodiment of the invention in detail, it is to be understood that the invention is not limited in its application to the details of construction and to the arrangements of the components set forth in the description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the concepts upon which this disclosure is based may readily be used as a basis for designing other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The accompanying drawings, which are incorporated in and form a part of the specification, illustrate embodiments of the present invention and, together with the description serve to explain the principles of the invention.

FIG. 11 illustrates data structures for a relational database for linking components of a personalized digital media asset with affinities;

FIG. 23 illustrates a narrative perception identification framework that enables matching of digital media assets to individuals.

DETAILED DESCRIPTION OF PREFERRED EMBODIMENTS

Figure 1:
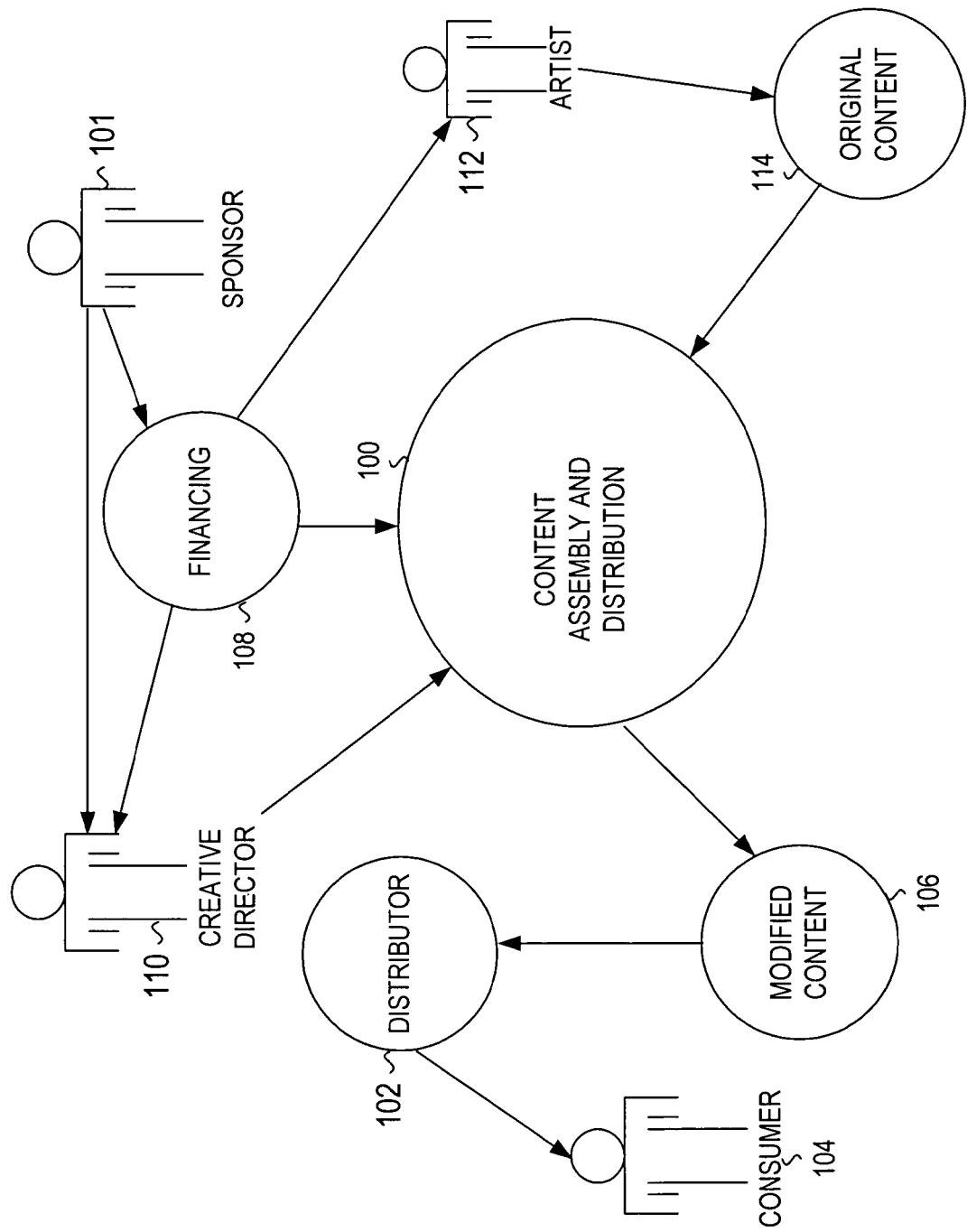
FIG. 1 illustrates a user-relationship diagram for an embodiment of the system.

In describing an embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With respect to the user, a number of terms are used that describe how the user is identified and profiled. As used herein the term "user identification" means a number, symbol, or alphanumeric sequence that identifies a single subscriber, a group of subscribers, a subset of subscribers, or a subscriber in a specific location or on a specific network.

The term "user profile" includes a stored or calculated profile that describes one or more aspects of the user, such as demographics, psychodemographics, and attributes. The profile can be determined from questions answered by the user, forms filled out by the user, and/or interactions of the user with the digital media narrative. Alternatively, the profile can be determined from the user's web surfing characteristics, shopping habits, television viewing habits, and/or actual purchases. Profiling of users based on these interactions, viewing habits, and purchases is well understood by those skilled in the art.

"User attributes" include aspects, characteristics, and qualities of the user that are useful for determining (matching, correlating, and selecting) digital media assets. These attributes may include characteristics such as affinities, likes or dislikes as described outside of affinities, perceptions, experiences, and other factors that play a role in determining the internal narrative perception identification framework.

The term "internal narrative traits preference topology" means a representation of personality, such as a representation that is similar to the Myers-Briggs personality classification scheme. However, the representation establishes a measure of the potential for impact on the individual as specifically applied to narrative and interactive narrative. The Keirsey temperament sorter is a personality test that scores results according to the Myers-Briggs personality classification scheme, and allows testing or classification to occur over the Internet. The Keirsey test allows viewers to create a personality inventory of themselves. The internal narrative traits preference topology thus provides for personality classification and gathers data from a variety of sources, including the individual's interactions with the interactive narrative. As can be seen in FIG. 23, the personality classification deals with personality traits such as engager v. bystander, identifier v. detacher, metaphorical v. literal. Other classifications can be included to further define a personality. Defined topology is the equivalent of the internal narrative traits preference topology.

"Narrative content" includes content used for story telling including story telling containing direct advertising, product placement advertising, or combinations thereof. "Story based" content refers to content that tells a story, which either is based on fact or is fictitious in nature, as opposed to a simple recitation of product characteristics. This is not to imply that advertisements that contain product characteristics or facts cannot be story based, only that the story based content contains those characteristics or facts in the context of a story.

"Trigger points" are occurrences or time points within a story or narrative content that may cause the recipient (viewer, reader, or listener) to take a particular interpretation at one or more levels or that may affect the user's emotional state. "Personalization trigger points" are those trigger points that allow for modification of the story or narrative content in support of customization of the content to match the internal narrative perception framework and appropriately influence the user.

Figure 4:
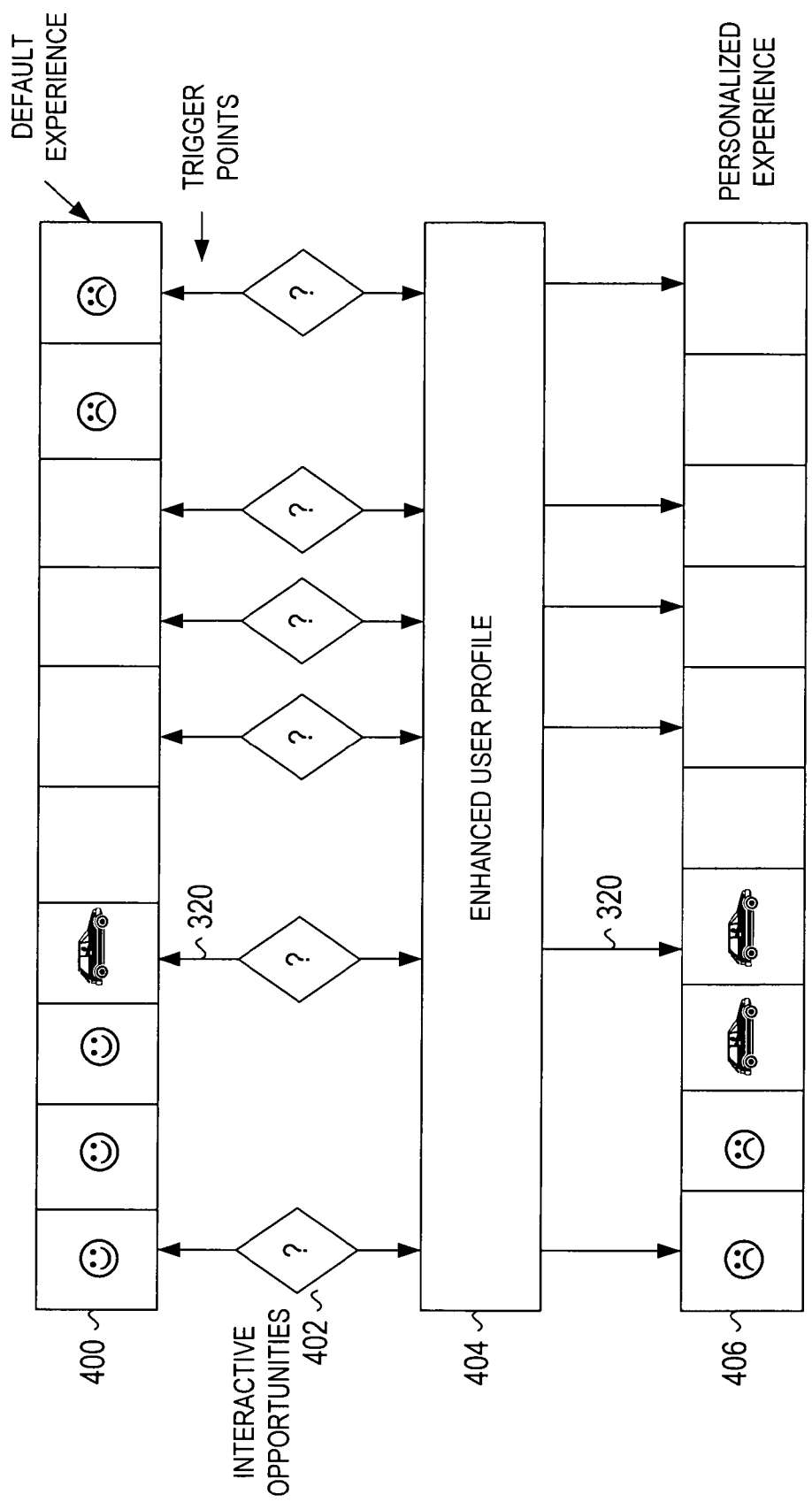
FIG. 4 illustrates the use of interactivity to create an enhanced user profile and an enhanced experience through a personalized digital media asset.

"Episodic" content refers to narrative content or stories that contain episodes, which either are arranged in a time sequence or are accessible to the user individually. A time sensitive sequence or set of episodes includes narrative content or stories that create personalized impact if temporally or sequentially changed. For example, a time sensitive sequence may include a mystery or story with a surprise ending that, per individual, may vary with respect to timing of delivery (i.e., wait 3 seconds versus 5) to build the optimal level of anticipation per individual. FIG. 4 illustrates other aspects of time sensitive episodic & expectation sequencing.

"Self-narrating" refers to interjecting elements of a user's life into the narrative that the user is watching. Self-narrative techniques take stories related to the user's life in a deeper way. Users can provide self-narrative content that may be incorporated as narrative or digital media assets that may be included in personalized narrative. As an example, a user may upload a photo of himself and that photo may be used in a personalized narrative being presented to another user. This may occur when a user accepts membership in a group and agrees to share a viewing experience with another user. Self-narrative content may include audience-generated content. This content may be self-sustaining in that it can automatically be incorporated into numerous personalized narratives and add another life or perspective to the narrative, as opposed to simply being inserted or viewed at the direct request of a user.

A "self narrating audience generated content classification" refers to the labeling of a digital media asset such that the individual or group generating the asset is known, as well as the potential for using that asset. As an example, a user may provide a photo of himself, and indicate that that photo can be inserted into narrative presented to a select group of users or potentially all users. Similarly, the user may upload other digital imagery, text, video, or other material that serves as a background, an overlay or another element in a narrative. The classification of this material determines how and when it may be used.

"Significance of affinity" is a measure of the strength of affinity and is useful in determining the level of attraction an individual has for a particular element. As an example, a user that repeatedly selects oranges in an interactive presentation would have a higher probability of having a high level of affinity for oranges. The degree of significance may be related to the probability of having an affinity for an element.

"Association rules" provide the ability to match digital media assets to an individual, through a correlation of the attributes of the asset with the assets of the individual in order to provide the highest level of impact. The correlation of the attributes may consist of summing the number of matching attributes, identifying key attributes, or providing a true/false test for one or more attributes. A relative weighting scheme may be incorporated into the correlation to give preference to or emphasize certain attributes. Correlation thus refers to the process of matching or selecting a digital media asset based on the overlap between the attributes of the individual and the asset, with the goal of having a greater narrative impact.

Figure 22A:
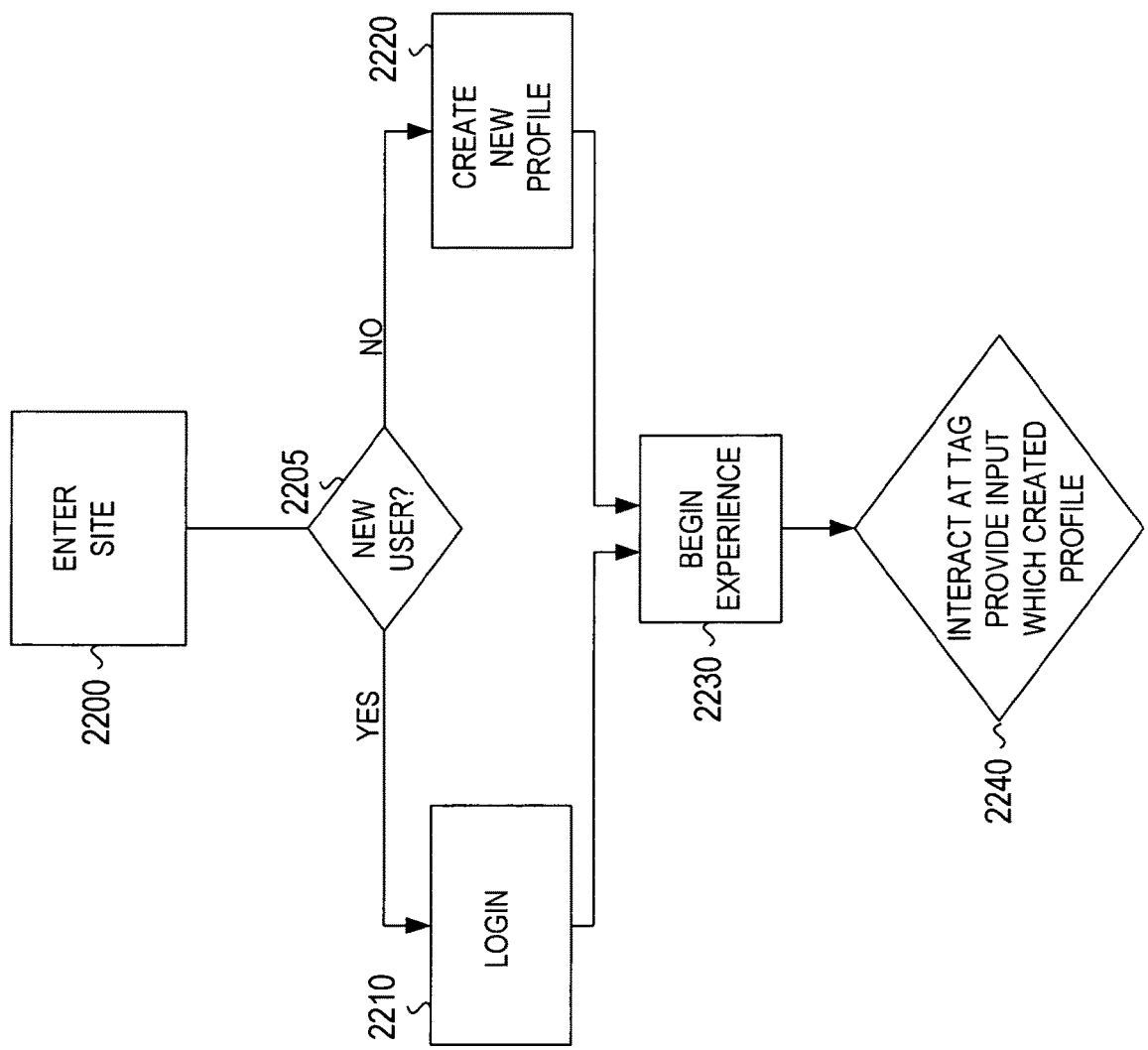
FIG. 22A illustrates a flow chart for the operation of the screens shown in FIGS. 15-21.
Figure 22B:
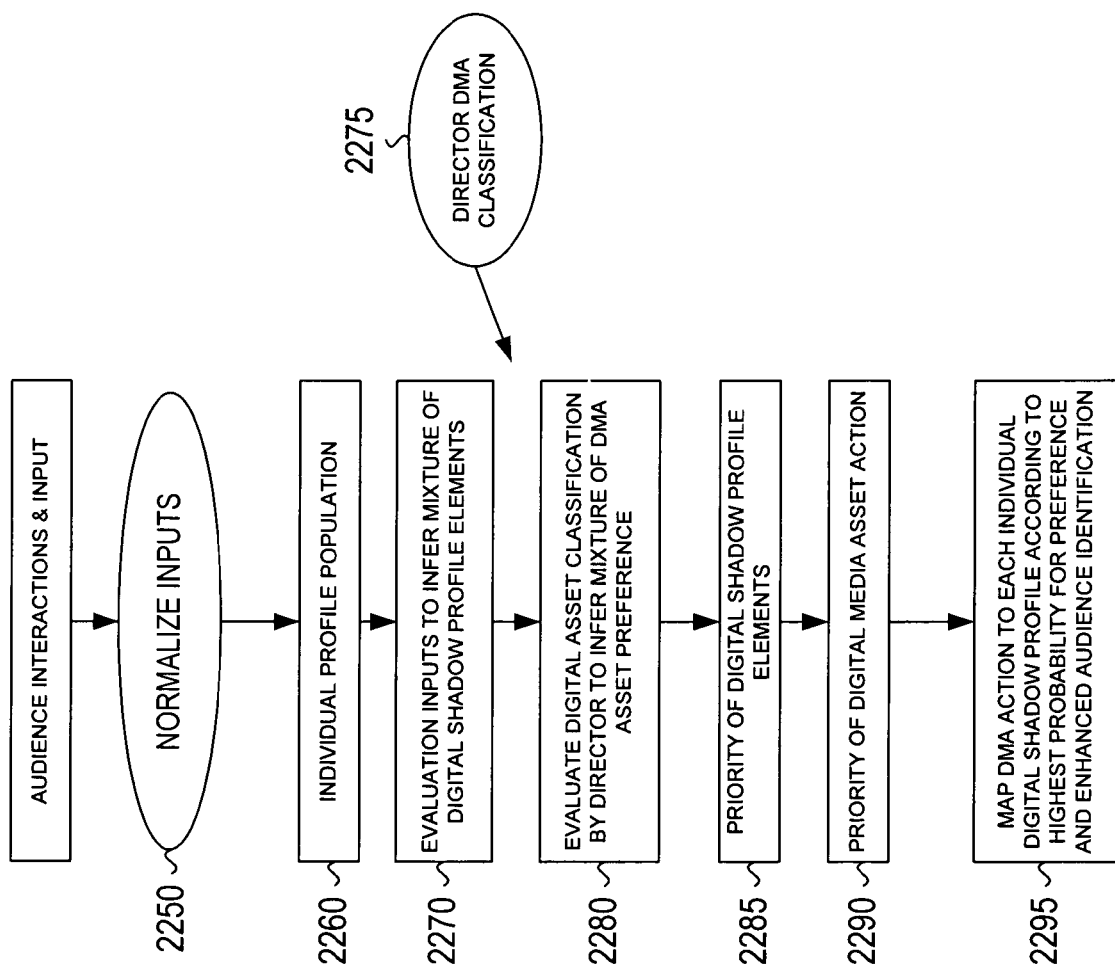
FIG. 22B illustrates a flow chart for the operation of a fuzzy logic based Enhanced Director Agent (EDA)

A "collective/collaborative classification," as illustrated in FIG. 22B, describes one or more attributes related to an individual's dynamics within the community and the potential for content to be defined within that dimension. Collective/collaborative attributes are those specific measures of the individual's dynamics within the community.

An "affinity" is a measure of how much an individual is attracted to a particular element of a narrative. As an example, an individual who was always served fried eggs on Wednesdays by his/her mother may have fond memories of that experience and may have a positive affinity for fried eggs, in particular on Wednesday. Conversely, an individual who was forced to eat cold fried eggs as a punishment may have a negative affinity for fried eggs.

FIG. 1 illustrates a detailed diagram for an embodiment of the system, in which a creative director 110 creates the personalized content and distributor 102 distributes the personalized content that is viewed by a consumer 104. Although FIG. 1 illustrates the creative director 110 and the distributor 102 as separate individuals or entities, the creative director 110 and the distributor 102 may be the same person/entity and have different economic arrangements with other users of the system. The creative director 110 works with the content assembly and distribution system 100 to take original content 114 produced by an artist 112 and create modified content 106, which is viewed by a consumer 104.

In terms of economic arrangements, in one embodiment, a sponsor 101 may provide financing 108 to one or more of the artist 112, the creative director 110 and the distributor 102, such that they have resources to provide media assets and to provide a viewing mechanism for the consumer 104. In one embodiment, the artist 112 is a musician who provides songs and musical videos as original content 114. In this embodiment, the sponsor 101 is a manufacturer, such as a manufacturer of consumer package goods who desires to advertise its products to the consumer 104. The sponsor 101 provides financing to the artist 112 and the creative director 110/distributor 102 to permit the creative director 110/distributor 102 to create a database system and the appropriate digital media assets for personalized viewing by the consumer 104.

In an alternate embodiment, the sponsor 101 finances the artist 112 to provide new material directly related to its product, which may incorporate elements of previously produced songs, videos or other artistic works. In this alternate embodiment, the sponsor 101 may retain a closer relationship with the artist 112 to produce content specifically for advertising its products. This content may be further personalized through the content assembly and distribution system 100 to produce modified content 106 for the consumer 104. This modified content 106 is the personalized digital media asset.

Note that in the description set forth above, the artist 112 need not directly interact with or be financed by the sponsor 101. Rather, one or more intermediaries, such as agents, producers, studios, distributors or other entities may represent the artist 112 to the sponsor 101. Accordingly, the term "artist" is intended to include an actual artist and/or one or more such intermediaries.

Figure 2:
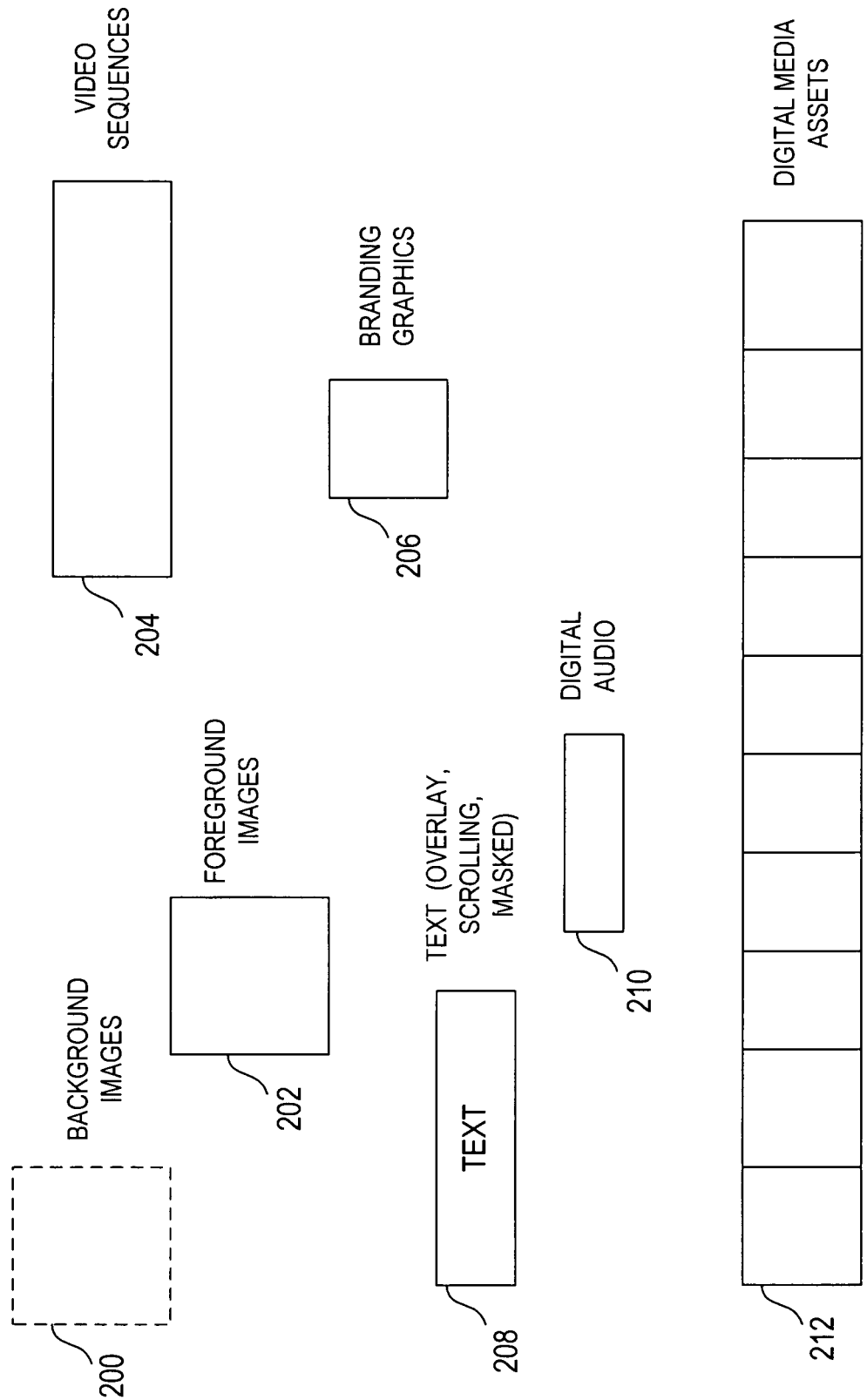
FIG. 2 illustrates the representative components of a digital media narrative and the digital media assets.

FIG. 2 illustrates the representative components of a digital media asset including background images 200, video sequences 204, foreground images 202, text 208, branding graphics 206 and digital audio 210. These elements may be combined to create digital media assets 212.

Background images 200 for digital media assets 212 may be still graphic images or MPEG based images, desktop colors, flash files, patterns or any other types of images that are typically used as background elements within current or future digital media narrative experiences. Video sequences 204 may be in the form of MPEG-2 or MPEG-4 video sequences, but may also be other types of video including but not limited to Real Video, AVI video, flash based video, animations, or other video sequences. Text 208 may include overlay text scrolling, masked text, and/or other types of textual messages that appear on a screen, such as tickertape messages that appear at the bottom of a screen. Branding graphics 206 may include icons, symbols, figurines or any other types of element that appear on a screen that are not typically thought of as video images. Foreground images 202 may include still images, such as photographs, drawings, animations or any other types of image, that are brought to the attention of a user in the foreground. Digital audio 210 may be any type of digital audio including MP3 audio or any other compressed or uncompressed digital audio streams, files or segments.

Although personalized digital media assets 212 are shown to have individual sets of frames, it is to be understood that the digital media assets may be a combination of all of the above aforementioned elements and may or may not contain individual frames, but may have certain points which delineate segments or pieces of the asset from the pieces, both temporally and in terms of content.

Figure 3:
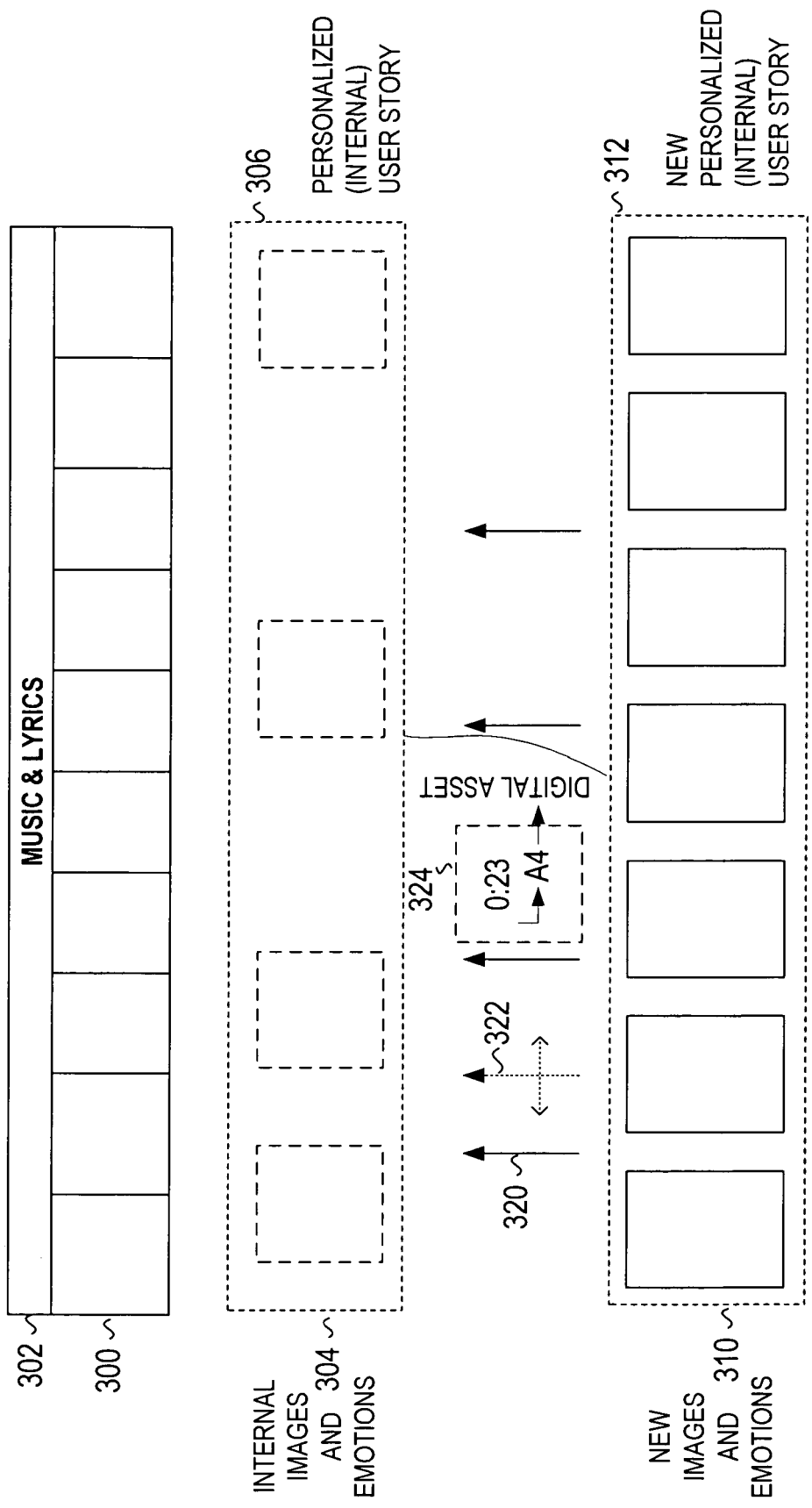
FIG. 3 illustrates the creation of a personalized digital media narrative.

FIG. 3 illustrates the creation of a personalized digital media assets based experience. In FIG. 3, an initial digital media asset video sequence 300 is combined with music and lyrics 302 to create a modified digital media asset that is personalized or internal to a user. This personalized user story 306 may contain images, audio, text and/or other content 304 that is expected to elicit certain emotions in the mind of the user.

An affinity may be the extent to which something creates an impact on the user, based on the user's life experiences. As an example, an old T-shirt may remind a user of an individual that previously wore that T-shirt. This may be a strong affinity if that person was very significant to the user (e.g., a parent, a spouse or a child). In some cases the user may not have an affinity for that object but may subsequently develop an affinity based on something that the user sees. As an example, if the user sees a magazine cover with an attractive person wearing an old T-shirt, this may create a new affinity. As another example, hearing a song while on a first date with a future spouse may create a new affinity to that particular song or artist. The user may have strong emotional feelings upon hearing the song because the song prompts the user to recall the early dating experience. Affinities and the quality of affinity thus define the extent to which the object or, in the case of the present system, digital media assets have an impact on users. Since affinities constantly change and may depend on a user's emotional state as well as past experiences, the system may update user profiles to determine which digital media assets should be used to create stronger emotions in the user.

The personalized (internal) user story 306 may be what the user perceives the digital media asset to be and may depend, at least in part, on the emotional state, demographics, psycho-demographics, cognitive states, social placement and/or group interaction dynamics within the online community, affinity for certain content features and/or other factors particular to the user. Trigger points 320 may be presented such that the digital media assets are customized to provide the user with a new personalized (internal) user story 312. This new personalized (internal) user story 312 may be composed of new images, audio, text and/or other content that, based on a user profile, are expected to trigger affinity element emotions 310 that are newer and/or stronger than emotions 304 previously experienced by the user or the expected emotions if the media assets were not personalized.

Trigger points 320 provide the mechanism for content management and the creation of a more personalized digital media asset based on a user's personal experiences. Trigger points 320 can be placed at various points in the digital media content, based on determinations of the creative director 110/distributor 102. For example, the creative director 110/distributor 102 may decide to place trigger points 320 in the digital media content 300 so that they occur at various points in time, when a certain character appears on the screen, when certain text is displayed, when words are spoken or sung, or based on other features of the digital presentation. During presentation of the digital media content, when the presentation reaches a trigger point 320, a script or other software program is executed. The creative director 110 or the distributor 102 may customize the script for each trigger point 320. The script may cause a computing device to access a database containing profile data relating to the user, and, based on the user profile information, the script may cause the insertion and/or replacement of video, graphics, audio or other material in the digital presentation. Furthermore, the timing of the presentation including but not limited to playback speed or changing the sequence of the presentation may be altered.

For example, the creative director 110 may place trigger points 320 in a digital media asset video sequence 300 each time that a particular character appears on screen. When the character appears on the screen, the script may, for example, access the user profile database to determine whether the user responds favorably to the character. If the user responds favorably to the character, the script may cause the insertion of a product advertisement on a location in the video screen whenever the character appears on the screen. Conversely, if the user does not respond favorably to the character, the server may take no action, or the system may insert different content into the screen when the character appears. Another example of a trigger point 320 is a portion of the digital media content that contains "hidden" advertisement, such as a character driving a particular brand of automobile while background music is played. The trigger point in this case could include both the type of vehicle and the background music. Upon reaching the trigger point 320, a script is run determining which type of vehicle manufactured by the sponsor may connect with the user and which song among a group may have the most appeal or greatest affinity to the user. For example, certain users may have a strong connection to pickup trucks and country music while other users may respond to Sport Utility Vehicles (SUVs) and classic rock. Upon reaching a trigger point 320, the system may select the make of vehicle that the character drives, the type of music played in the background and the volume of the background music. The system could also access additional information outside of the user profile to determine whether insertion should occur. For example, if a first user's profile indicates that the user has an affinity for a second user, when the character appears on the screen the system may determine whether the second user is also viewing the presentation at the same time. If so, the system may place an icon on the screen to indicate to the first user that the second user is also viewing the presentation.

In addition to trigger points 320, flexible trigger points 322 may be utilized. Flexible trigger points 322 have the property that they may be moved in time or entirely deleted. Flexible trigger points 322 thus allow further personalization of the digital media asset experience based on specific assets of the user typically learned through typical activity of the user with digital media asset 212. Trigger points 320 and flexible trigger points 322 may include time stamps and trigger point IDs 324. As represented in FIG. 3, time stamps and trigger point IDs 324 may provide an indication of when the trigger point occurs 322 and the affinities associated with that user.

FIG. 4 illustrates a default experience 400 being shown to a user with interactive opportunities 402 in conjunction with trigger points 320. The trigger points 320 may be used to present interactive opportunities 402 to the user. Based on the user's responses to these interactive opportunities 402, an enhanced user profile 404 may be created. The enhanced user profile 404 may subsequently be used in conjunction with trigger points 320 to create a personalized experience 406. Personalized experience 406 may include different content which is better suited to the user's demographics, psycho-demographics, cognitive states, emotional states, social placement and/or group interaction dynamics within the online community, and/or affinity for certain content elements.

For example, the default experience 400 may be a new music video having interactive opportunities 402 that include selecting whether the video contains scenes from Spain or Italy followed by selecting scenes from New York City or the Rocky Mountains. The user's selections may be stored and utilized in personalizing future presentations. For example, if a user selects that a character travels from Italy to the Rocky Mountains, the system may infer that the user enjoys mountain scenery and perhaps skiing. Upon viewing an advertisement for a soda, the digital content may include a skier stopping to drink the soda. Conversely, if the user preferred New York City, the digital content may contain a dancer at a club stopping to drink the soda.

In another embodiment, a new user is asked a series of yes/no questions, multiple choice and/or open-ended questions. For example, a user may be asked to answer questions within the context of the narrative such as: "What is your favorite animal?"; "Would you rather ride a motorcycle or drive a sports car?"; "Do you prefer blue, red, green or yellow?"; or "True or false, I like fishing?" Questions may include demographic questions, such as gender, age, ethnic background, income, education level and region of residence. A user may also be asked general questions about his or her mood, state of mind or personality traits. The answers may be compiled to create a user profile which includes demographic information and personal likes/dislikes. The demographic information may be used to select the appropriate general database to which a member belongs, such as young female or middle-aged male. The questions may be designed to gauge the user's personality traits and affinities, the user's emotional state and the user's emotional response to media content. The queries may be more abstract than direct questions, such as "Pick a happy color," "Choose a word that saddens you," or even something similar to projective psychological tests such as an ink blot test or word association test.

Demographic information may be compiled because an individual's demographics have a great affect on his or her interest. A middle-aged parent is more likely to be interested in family oriented media narrative while a single young-adult is more likely to be interested in more risqué media narrative. Also, a user that is in the economic middle-class may be more interested in high-priced leisure activities such as golf or skiing, while a user that is in a lower economic class may be more interested in less costly activities, such as basketball. Compiling an individual's demographics lends a wealth of information on materials that are more likely to have a personal connection.

Figure 5A:
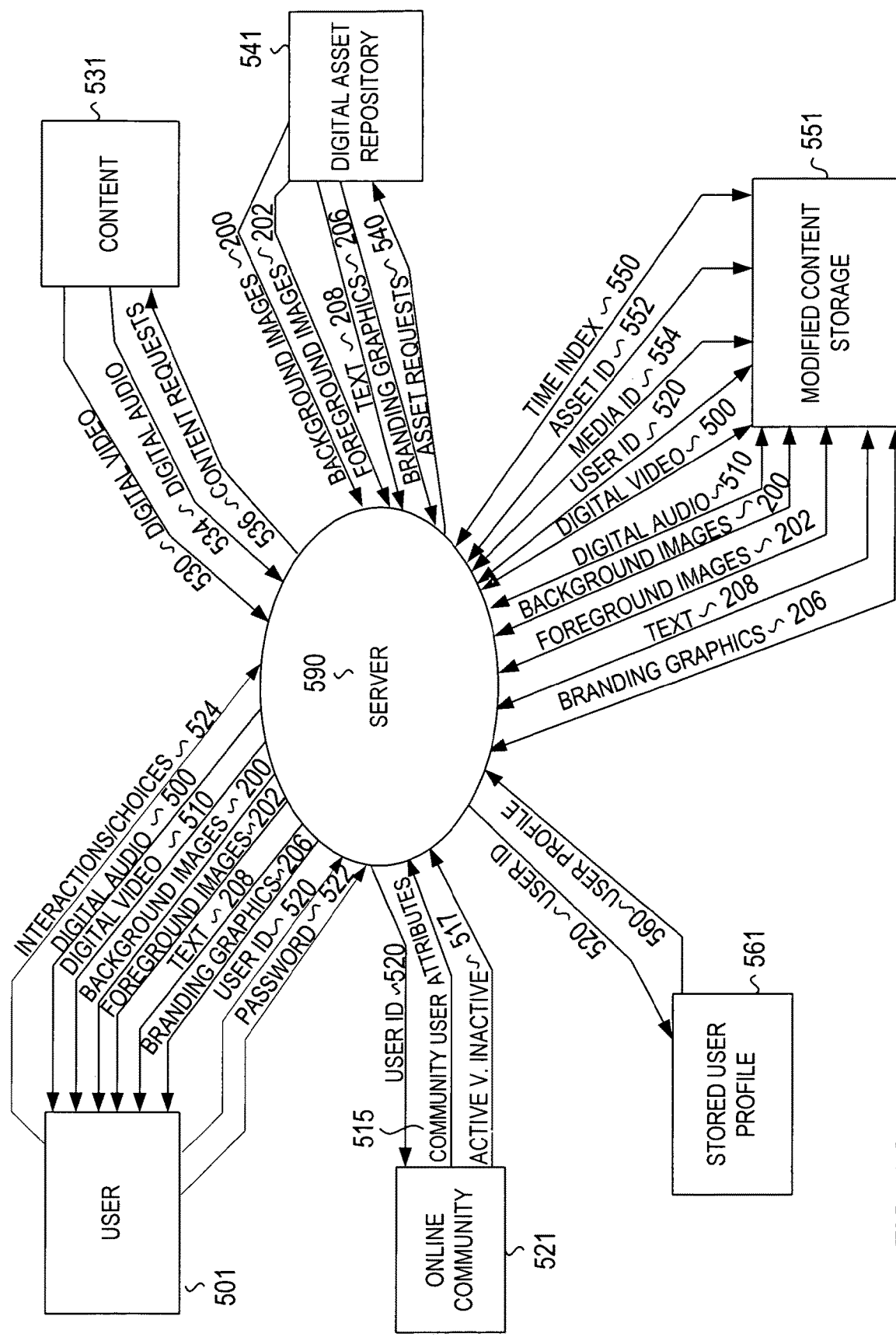
FIG. 5A illustrates a context diagram for digital media narrative asset personalization.

FIG. 5A illustrates a context diagram for one embodiment of a digital medial narrative asset personalization system (server) 590. In this embodiment, a user 501 receives the assets that comprise the personalized digital media asset 212 (FIG. 2), and supplies a user ID 520, a password and interactions/choices.

The server 590 may develop the personalized digital media asset 212 from content 531 and the digital asset repository 541. In one embodiment, the server 590 stores modified content in a modified content storage medium 551. In an alternate embodiment, the modified content is not stored, and the personalized digital media asset is presented to user 501 via the server 590.

Referring again to FIG. 5A, the user may also participate in an online community 521 providing a user with the ability to interact with other users. In one embodiment, the online community 521 includes the ability to share a viewing or listening experience with another user, thus creating new affinities for the content of that viewing or listening experience.

In one embodiment, the user 501 provides a user ID 520, a password 522, and interactions/choices 524 to a server 590. The user 501 may be presented with digital video 500, digital audio 510, background images 200, foreground images 202, text 208, digital media graphics, digital animation, and/or branding graphics 206. The user 501 may participate in an online community system 521 in which the server 590 sends the user ID 520 to the online community system and receives lists of community user attributes 515 and active vs. inactive status 517. In this way, the server 590 may determine which users are online and which users may be able to share a personalized digital asset experience. Stored user profiles 561 are stored and the server 590 may access a user profile 560 using a user ID 520.

Content 531 may also be stored and provided to the server 590 in the form of digital graphics or video 530 and/or digital audio 534, optionally based on content requests 536.

A digital asset repository 541 may receive asset requests 540 from the server 590 and may provide items such as background images 200, foreground images 202, text 208, and branding graphics 206.

In one embodiment, the modified content is stored in modified content storage 551 and includes a time index 550, an asset ID 552, a media ID 554, a user ID 520, digital video 500, digital audio 510, background images 200, foreground images 202, text 208, and/or branding graphics 206.

In an alternate embodiment, personalized digital media narrative is created from the content 531 and the digital asset repository 541. The narrative may not be stored as modified content but may be directed at the user 501 without storage.

Figure 5B:
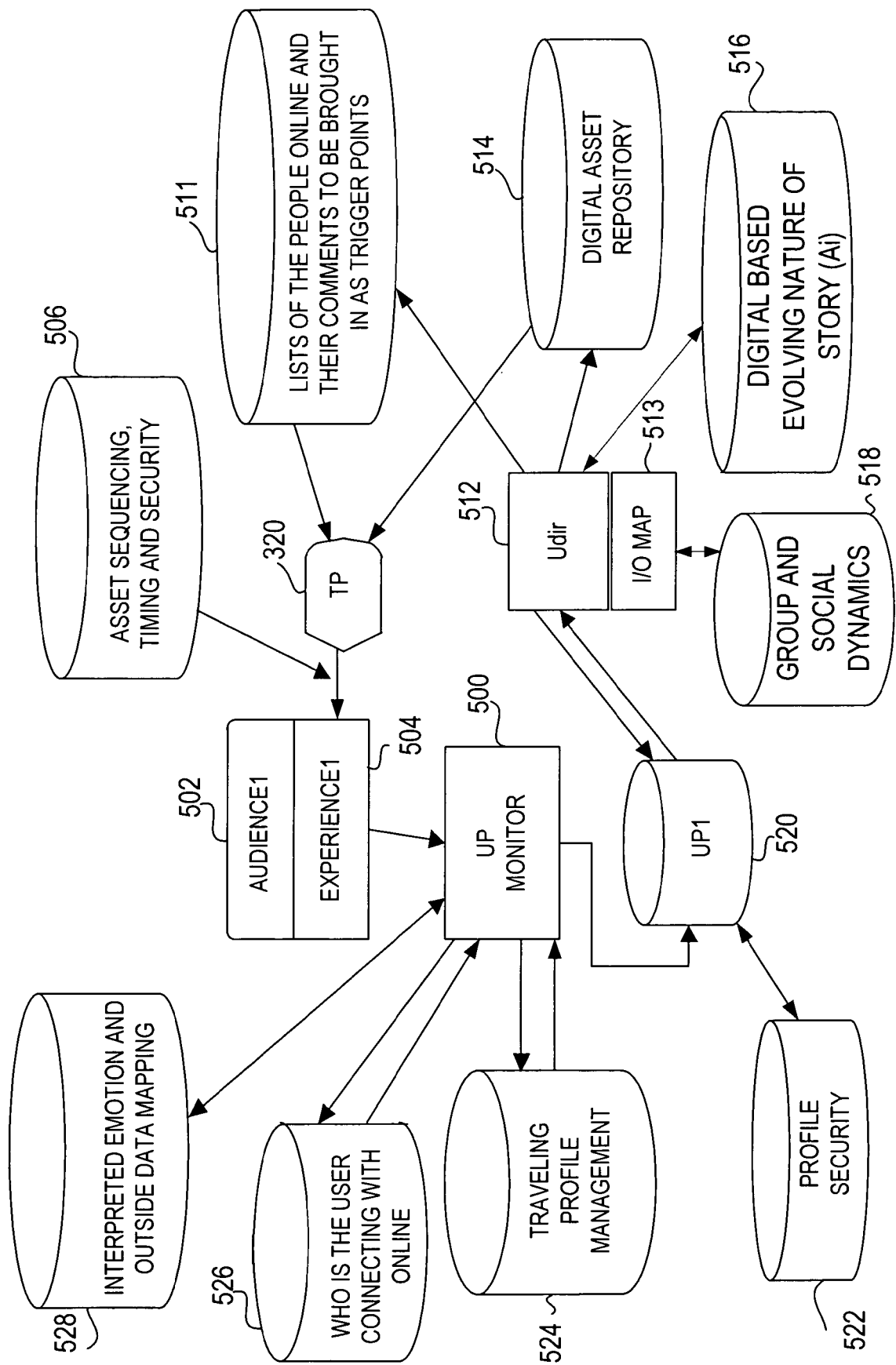
FIG. 5B illustrates potential databases that may be used in creation of the personalized digital media asset and the relationships between those databases.

FIG. 5B illustrates potential databases that may be used in the creation of the personalized digital media asset and the relationships between those databases. In FIG. 5B, an Uber-director (Udir) 512 is used to create a user profile 561. Security is maintained in the user profile 561 through the use of a profile security database 522 and security management system. The Udir 512 works in conjunction with an I/O map 513 to interface to other databases, such as a group and social dynamics database 518. The group and social dynamics database 518 may permit the user to interact with other users of the digital media asset to determine the dynamics between that user and the group. The Udir 512 may also work with the digital based evolving nature of the story 516 to create the personalized digital media asset. The actual elements used to complete the digital media asset may be contained in digital asset repository 514.

Referring again to FIG. 5B, trigger points 320 may be used to create an experience 504, which is viewed by an audience 502. Trigger points 320 work in conjunction with the digital asset repository 514 to bring lists of online users and their comments 511 in at the trigger points 320. Asset sequencing, timing and security 506 may also play a role in determining the final digital media asset which is presented as the experience 504 to the audience 502.

A user profile monitor 500 may also work to understand outside emotion and data mapping 528 to determine whom the user is connecting with online 526 and the traveling profile management 524, which may ensure that an individual profile travels from program to program. Each of these elements may act to create a more complete stored user profile 561 and thus a better customization of the experience 504.

Figure 6:
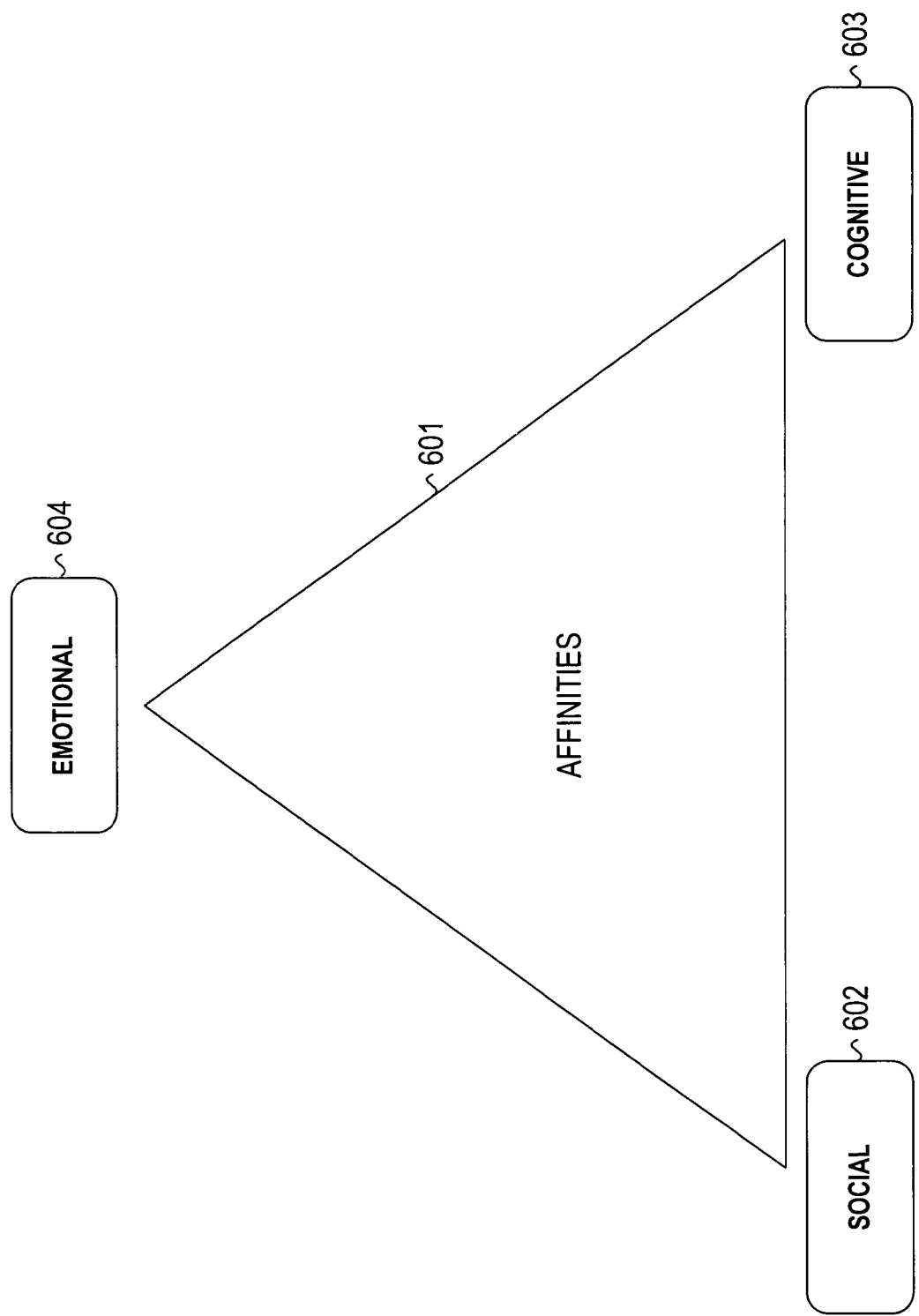
FIG. 6 illustrates exemplary relationships between the social, emotional, and cognitive affinity elements.

FIG. 6 illustrates exemplary relationships between social, emotional and cognitive elements, all of which may define a user's affinities. As is understood by those skilled in the art, a user's reality may be determined by a number of elements including: his or her emotional attraction 604 to certain affinities 601 and elements that are presented; his or her interaction with others during consumption of an experience (which is the user's social element 602); and the user's cognitive element 603, which is his or her awareness and perception of the world around him or her. These three elements may form the basis for a user's reality as perceived by him or her.

The three elements, as illustrated in FIG. 6, may include elements of an "internal narrative perception identification framework topology," which determines the user's tendencies, temperaments and provides a classification so as to increase the digital media narrative impact through providing media elements. Other examples of the elements of the internal narrative perception identification framework (see FIG. 23) include social/collective attributes, time sensitive, episodic and expectation sequencing, self-narrating content classification, the user's tendency to be literal vs. metaphorical, an identifier vs. a detacher, or an engager vs. a bystander. These elements of personality are well known by those skilled in the art and are exemplary only. Other attributes may be used to define the user's internal narrative perception identification framework topology.

Figure 7:
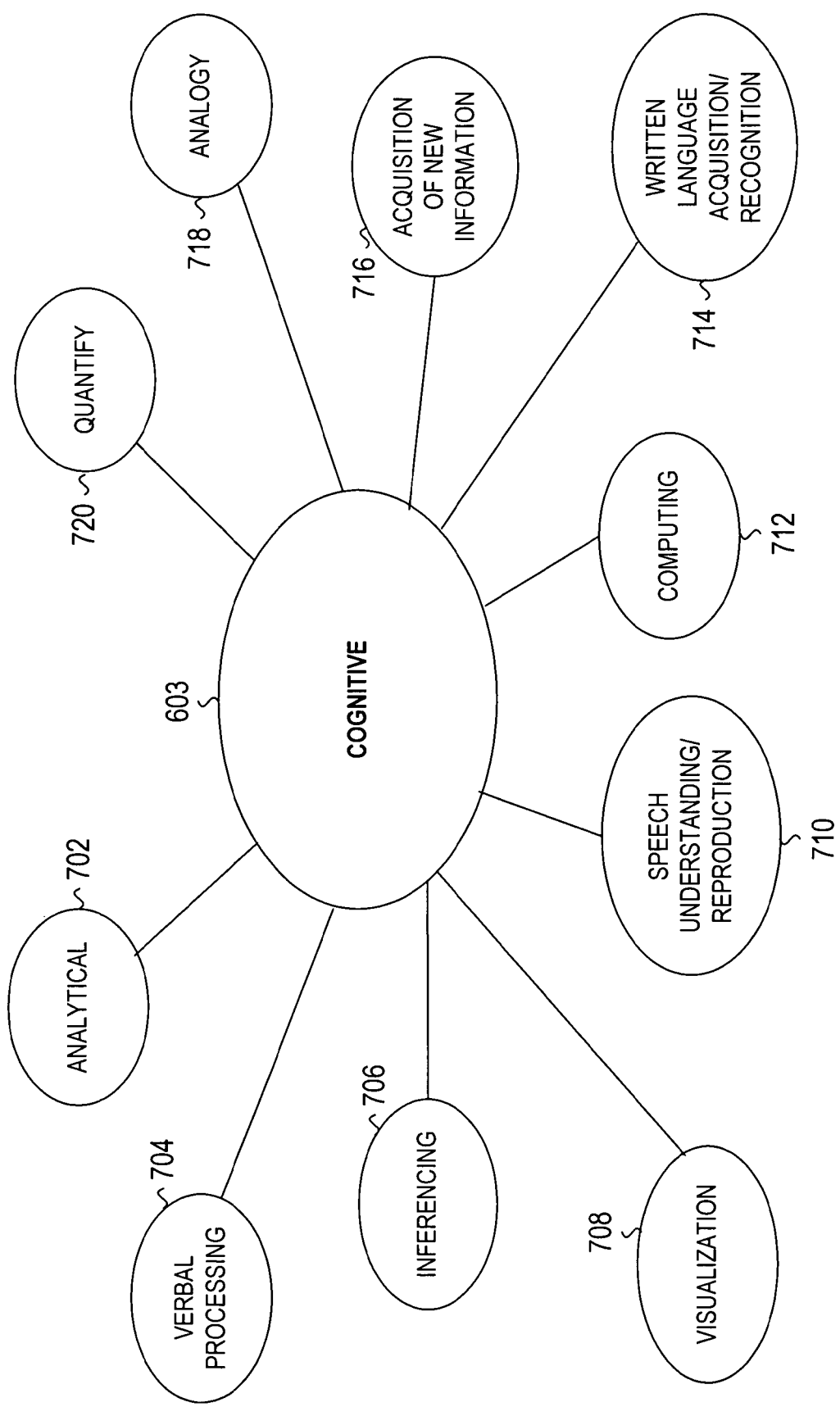
FIG. 7 illustrates exemplary components of the cognitive element.

Referring to FIG. 7, exemplary components of the cognitive 603 element may include: analytical skills 702 or the ability of a user to become consciously aware of elements that are being delivered and to analyze elements that he or she perceives; verbal processing 704 or the ability to verbalize his or her reality; inferencing 706, in which individuals infer the meaning of certain elements based on other elements; visualization 708 of elements of the reality; the understanding and reception of speech 710; the user's ability to compute things 712; the user's ability to communicate in written language and/or acquire new information 714; the user's preference in method of acquisition of information 716; the users' ability to reason by analogy 718; and user's ability to quantify 770.

Figure 8:
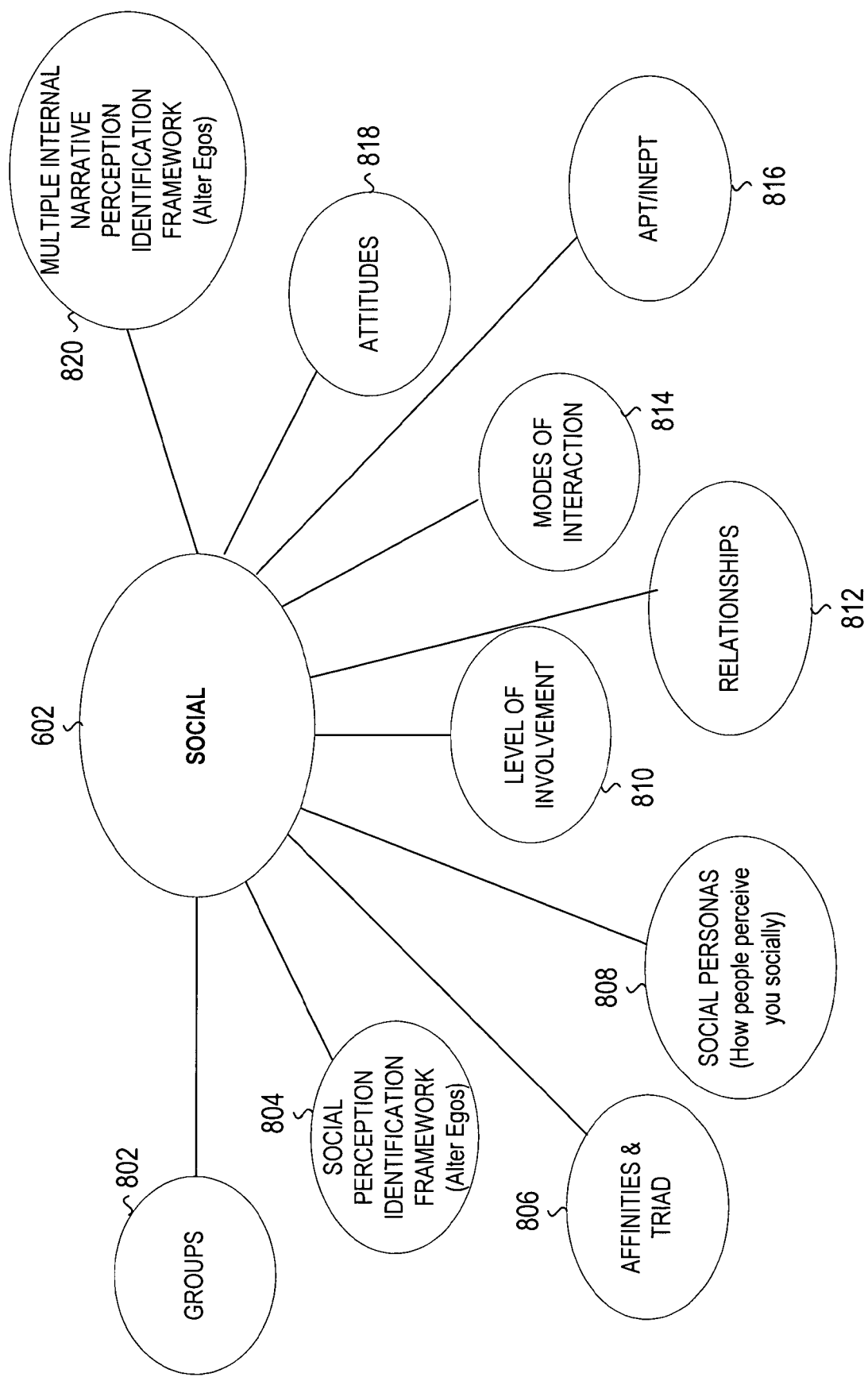
FIG. 8 illustrates exemplary components of the social element.

FIG. 8 illustrates exemplary social elements 602 and their components therein. These components may include: the groups 802 that the user is affiliated with; a social perception identification framework 804, such as a user's on-line personality or alter ego; the social personas 808, which are how people perceive that user; a user's social affinities 806; the level of involvement 810 that the user has with other individuals; the relationship 812 the user has with other individuals, the modes of interaction 814 or how the user communicates and interacts with other individuals; the ability of the user to be apt or, alternatively, inept in performing functions, such as social interaction 816; the attitudes 818 the user has; and internal narrative perception identification frameworks 820.

Figure 9:
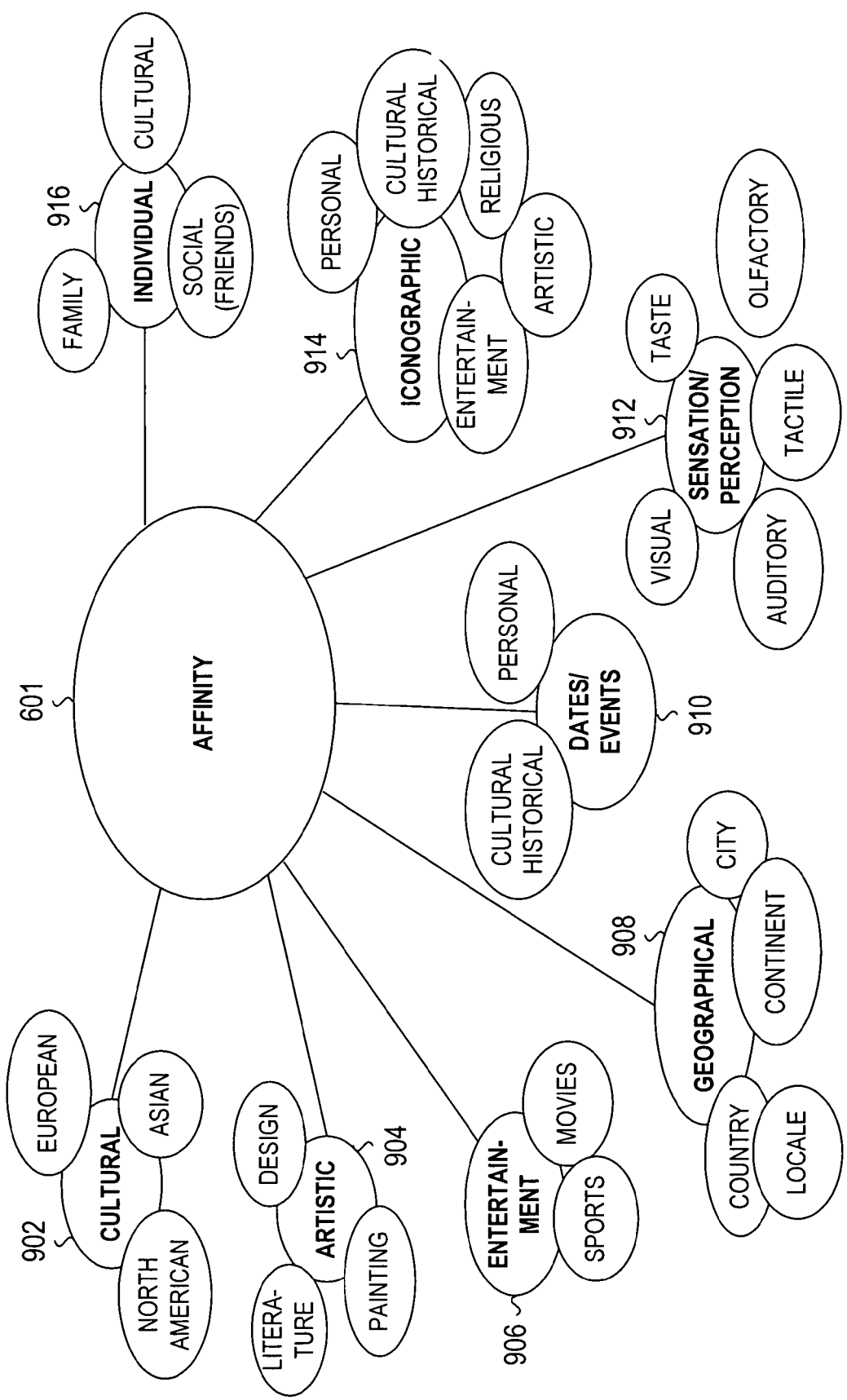
FIG. 9 illustrates exemplary components of affinity.

FIG. 9 illustrates exemplary components of affinity 601, including cultural affinities 902 in which the user is associated with a particular culture or race; artistic affinities 904; his or her digital media narrative (entertainment) likes and dislikes 906; his or her geographical affinities 908; the dates and events that are important to that user 910; his or her sensation and perception of the world 912, his or her iconographic perception of the world 914; and his or her individual affinities 916. These affinities may determine how a user perceives the world and may represent the particular elements that allow a user to influence other human beings. Users perceive or receive a sensation, consciously or unconsciously create the basis for emotions, and provide a catalyst for thoughts and emotions that are stored in the brain through an n-Gram encoding, ultimately placing the experience in a user's memory. By having knowledge of a user's affinities, it may be possible to influence the user by creating a closer bond through personalization to make a narrative experience more meaningful to that user.

Figure 10:
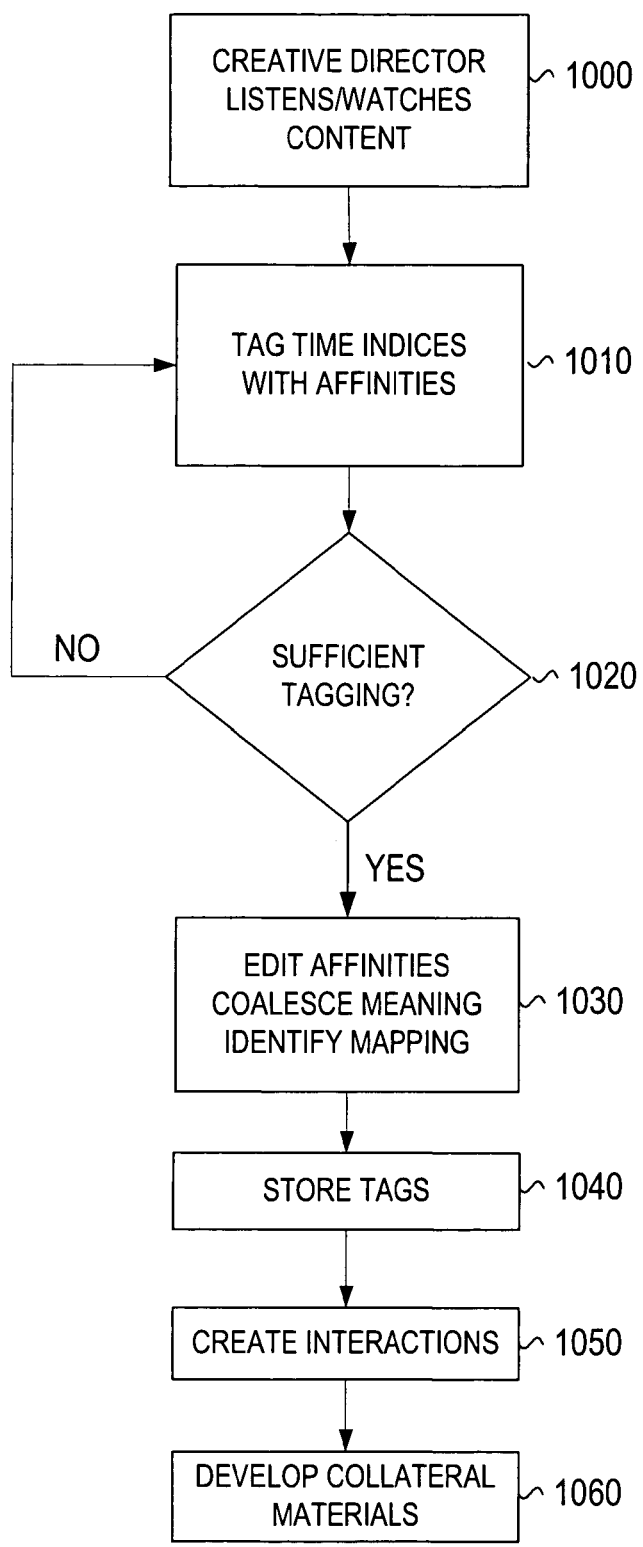
FIG. 10 illustrates a flowchart for the development of the components for a personalized digital media narrative.

FIG. 10 illustrates a detailed flow chart for an embodiment of the development of the components for a personalized digital media asset. Referring to FIG. 10, the creative director 110 may watch and listen to content in step 1000 and subsequently tag the time indices with affinities in step 1010. A test 1020 may then be performed to determine if sufficient tagging has taken place. This step may include comparing the number of tags set to a minimum threshold value or determining if all of the tags determined by a test sequence have been set. If further tagging is needed, a return to step 1010 occurs. If sufficient tagging 1020 has occurred, the affinities may be edited and associated with certain digital media assets in step 1030. Step 1030 may represent the affiliation of tags to trigger points 320 having certain affinities, such that based on a user's profile and interaction it becomes possible to retrieve the appropriate components of the digital media asset 212 to create a personalized experience. Subsequent to the creation of the affinities, the tags may be stored in step 1040 and the interactions may be created in step 1050, which may result in the development of collateral materials for narrative marketing in step 1060.

FIG. 11 illustrates exemplary tables for a user profile when the user profile is stored in a relational database. A first table 1101 may contain a user ID, password, and e-mail address of a user. A second table 1111 may contain the user ID, a particular profile element, a known/unknown status field, and an importance field. The second table 1111 may tabulate profile elements pertaining to the user. Profile elements may include any number of affinities previously discussed, internal narrative perception identification framework profile elements, or any other attributes of the user. A third table 1121 may contain the user ID, one or more profile elements and a value ranking for each profile element. The value may indicate that the user has an affinity for that particular type of profile element and the ranking of that value. As illustrated in FIG. 11, aspects of the user's affinity for art may be known. These aspects may have been determined by one of the methods detailed earlier. In the example shown, it is known that the user has an affinity for abstract and renaissance art. In one embodiment, the rank column of the third table 1121 is used to represent the strength of a positive affinity. In this embodiment, the ranking indicates that the user likes renaissance art more than abstract art. In another embodiment, the rank column of the third table 1121 is used to illustrate how strong the affinity is with that particular value. In such an embodiment, higher rankings do not indicate stronger positive preferences, but rather indicate stronger impact data structures for relational databases used to link components for personalized digital media assets with affinities.

Figure 12:
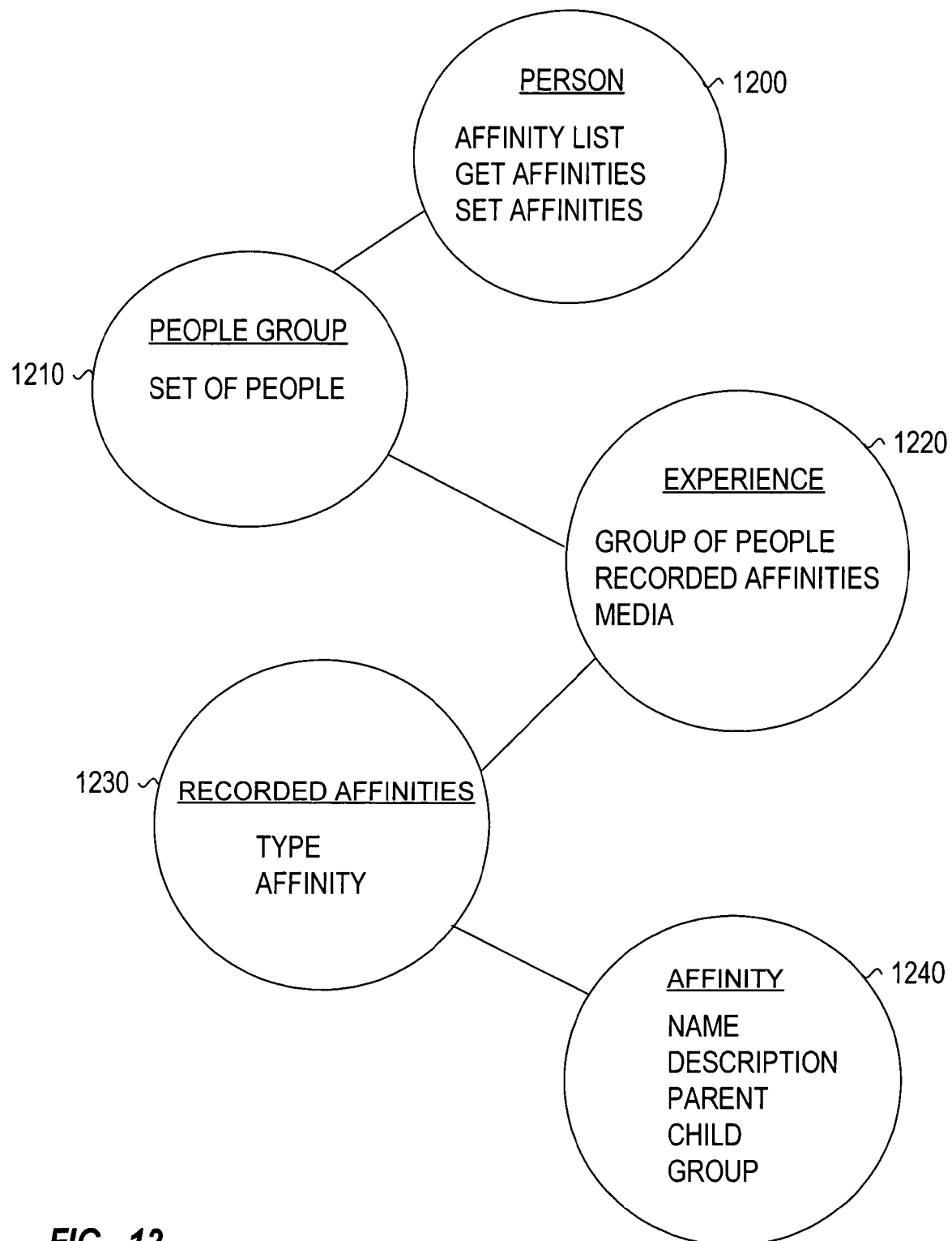
FIG. 12 illustrates an object oriented approach for linking components of a personalized digital media asset with affinities.

FIG. 12 illustrates an object-oriented approach for storing user profile elements and linking components of a personalized digital media asset with affinities. Using an object-oriented approach, a person object 1200, containing a profile of elements and set element commands, may be created and related to a people group object 1210. A people group object 1210 may also be related to an experience object 1220, which contains aspects of the profile element including the name and description of the profile element as well as its relationship to other objects, which allows retrieval of recorded affinities 1230. Individual affinities 1240 may be separate objects that contain specific elements known to be important to that user.

The database structures illustrated in FIGS. 11 and 12 are exemplary only, and illustrate certain aspects of the user profile and his or her affinities for certain objects and shared experiences that are part of his or her social interactions. Regardless of the particular database structure used, some or all of the aspects of the user's reality described earlier may be captured in a database to permit a user's profile to determine digital media assets that have a strong impact on that user. The optimization process of finding the strongest or most appropriate affinities and best match to the user's internal narrative social perception identification framework 804 may be based on a number of algorithms. Exemplary algorithms may include look-up tables, in which values of profile elements are matched to digital media assets, and correlation algorithms, which correlate profile elements, values, and ranks with profile elements, values, and ranks for a digital media asset to determine the best digital media asset to present. Other techniques for matching the user profile to the digital media asset may include neural networks and fuzzy logic, wherein aspects of the user profile are used to train the network or as inputs to the fuzzy logic system to determine the best digital media asset. Other types of artificial intelligence techniques, well known to those skilled in the art, may also be used to find the digital media asset, or sets of digital media assets, that have the largest impact on that particular user.

Figure 13:
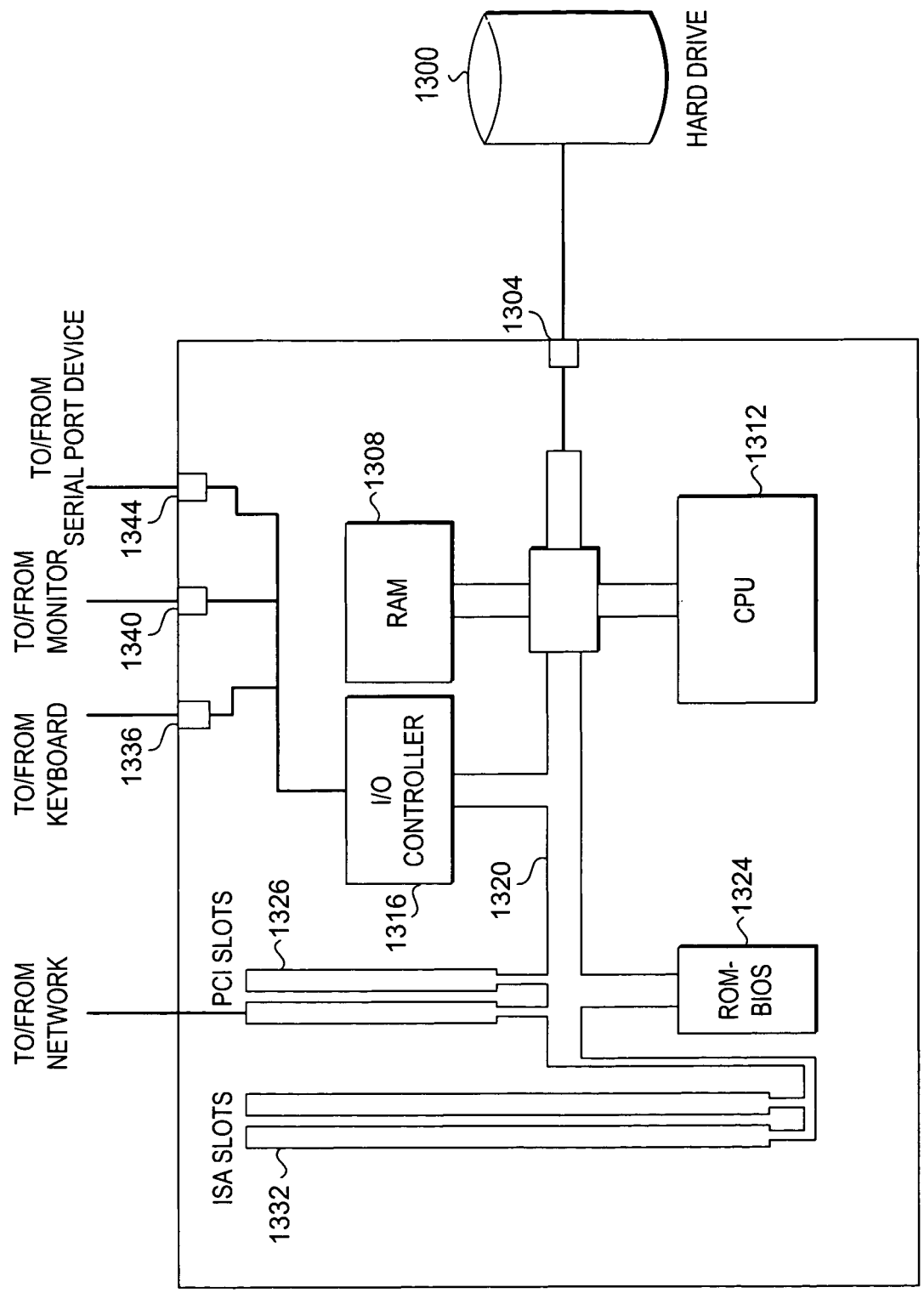
FIG. 13 illustrates a computer on which the invention can be built.

FIG. 13 illustrates a block diagram of a computer system for a realization of the server 590 based on the reception of multimedia signals from a bi-directional network. A system bus 1320 transports data among the CPU 1312, the RAM 1308, Read Only Memory—Basic Input Output System (ROM-BIOS) 1324 and/or other components. The CPU 1312 accesses a hard drive 1300 through a disk controller 1304. Standard input/output devices are connected to the system bus 1320 through the I/O controller 1316. A keyboard may be attached to the I/O controller 1316 through a keyboard port 1336 and the monitor may be connected through a monitor port 1340. A serial port device may use a serial port 1344 to communicate with the I/O controller 1316. Industry Standard Architecture (ISA) expansion slots 1332 and Peripheral Component Interconnect (PCI) expansion slots 1326 allow additional cards to be placed into the computer. In an embodiment, a network card is available to interface a local area, wide area, or other network.

Software to provide the functionality for a personalized digital media asset creation may be developed using a number of computer languages such as C, C++, Perl, Lisp, Java and other procedural or object oriented languages. Different programming languages may be used for different aspects of the system, such that a first programming language may be used for the content creation process illustrated in FIG. 10 and a second programming language may be used for the determination of the digital media assets to present to the user.

In one embodiment, the software may be a web-based application containing program modules. The program modules may include Java servlets, Java Server Pages (JSPs), HyperText Markup Language (HTML) pages, Joint Photographic Expert Groups (JPEG) images, Macromedia Flash MX movies, and/or a reusable Macromedia Flash MX component. The software may be executed on a compatible server environment including a web server, servlet container, Structured Query Language (SQL) database and Java Database Connectivity (JDBC) driver.

The Macromedia Flash MX movies and the reusable Macromedia Flash MX component may include multiple Macromedia Flash MX source files. A programmer may supply a first file that contains code for a Time Frame component and/or a reusable Flash MX component that implements the user side of the trigger point 320. An implementation may include visually framing the image to be displayed and resizing the image to be displayed to fit the frame, if necessary. For example, a programmer may supply a second file that includes code having two Time Frame instances and three buttons per Time Frame, the buttons including a "Warmer" button, a "Colder" button and a "Reset" button. The "Warmer" button may set a variable indicative of an affinity value to a lower value and load an image (or images) from the server that correspond to the new variable value. Similarly, the "Colder" button may set the affinity value variable to a higher value and load an image (or images) from the server that correspond to the new variable value. The "Reset" button may reset the variable to a mid-range value or the previously stored value for the user. As an alternative to the second file, a third file may be stored including a Time Frame instance, a "Load preferred image" button and two or more text entry boxes. The user may utilize text entry boxes to enter, for example, an affinity group name and a username. When the user enters valid information into both text entry boxes and clicks on the "Load preferred image" button, the information may be sent to the server. The server may use a database table to select an image based on the received information and may return the selected image to the user.

The application software may include multiple database tables such as tables of internal narrative perception identification frameworks, current users, user specific social affinities, user specific emotional affinities, and/or trigger points. In an embodiment, the application software may include a table that specifies an image that best represents the element for a specific affinity element group and affinity element.

The application software may include one or more HTML pages used to access the Macromedia Flash MX source files and to update the stored user Profile. The application may include one or more Java servlets. In an embodiment, a first Java servlet is utilized to find the affinity elements having the maximum value for the specific user, among all affinity elements in a specified group, and return the image corresponding to that element having the maximum value. In the embodiment, a second Java servlet is utilized to display the affinity values for the user, the affinity type and the affinity element group and to provide a means for the creative director 110 to update the affinity values.

Figure 14:
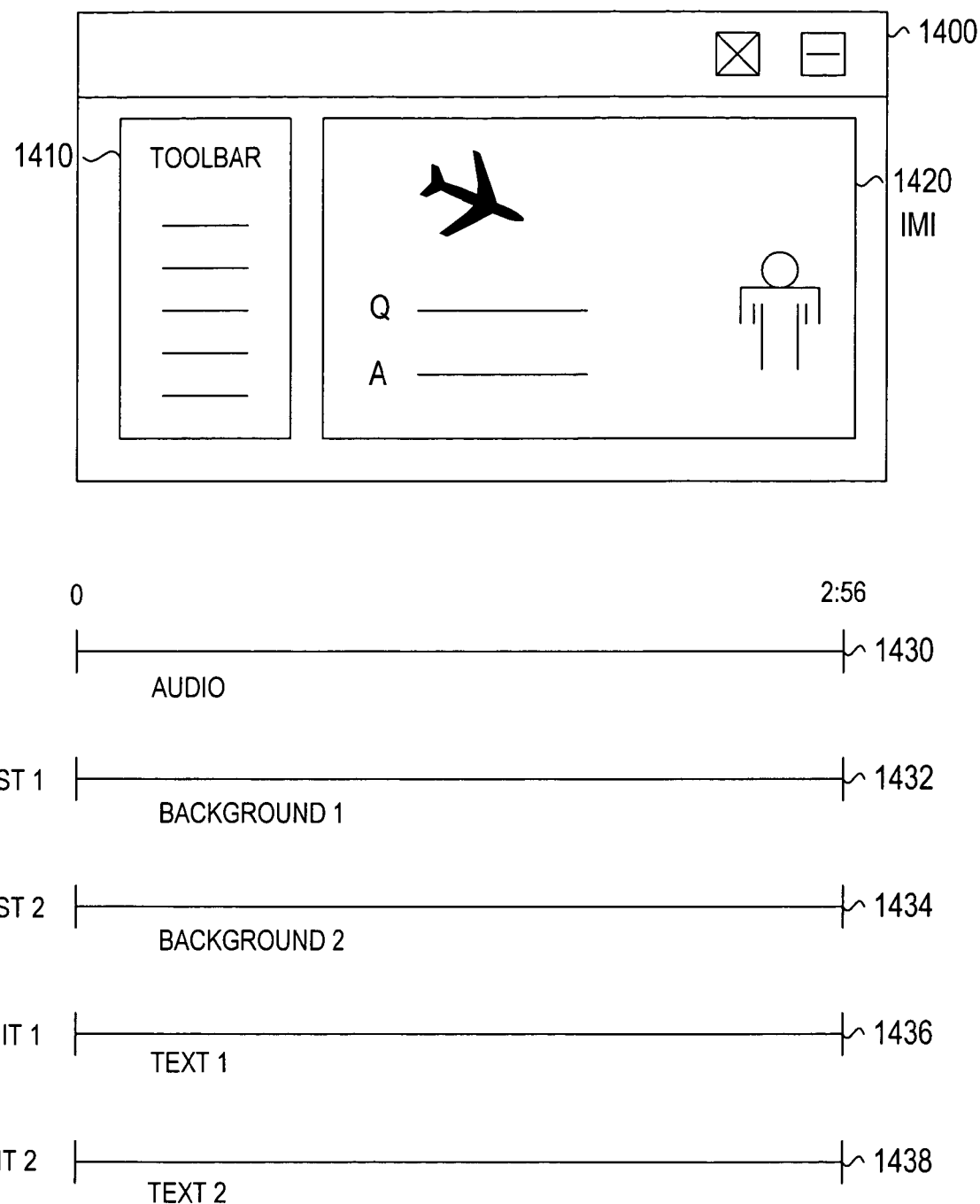
FIG. 14 illustrates the construction of an Interactive Musical Intersode (IMI)

The application software may include a plurality of JPEG image files that are provided from one or more sources. The sources may include any public source of image files, public copyrighted files with an appropriate copyright agreement or private files FIG. 14 illustrates the construction of an Interacting Musical Intersode (IMI). When used herein, Interactive Musical Intersode (IMI) may refer to an embodiment of a personalized digital media narrative program that is used to create a personalized internal narrative experience for the user. Referring again to FIG. 14, a window 1400 is presented which contains the IMI 1420 and a toolbar 1410 for the construction of the IMI 1420. In one embodiment, the creative director 110/distributor 102 views the elements which comprise the digital media asset repository. In an embodiment, these elements include audio 1430, video option/graphic option track 1 1432, which comprises background option 1, video option/graph option track 2 1434, which comprises background option 2, overlay text option 1 1436 and overlay text option 2 1438. In one embodiment, each of these digital media asset options is linked to an affinity, such that switching can occur between these elements at the appropriate trigger points 320. In one embodiment, the IMI is realized using Flash such that overlays are created and switching occurs between background overlays and the appropriate audio to create the IMI 1420.

Figure 15:
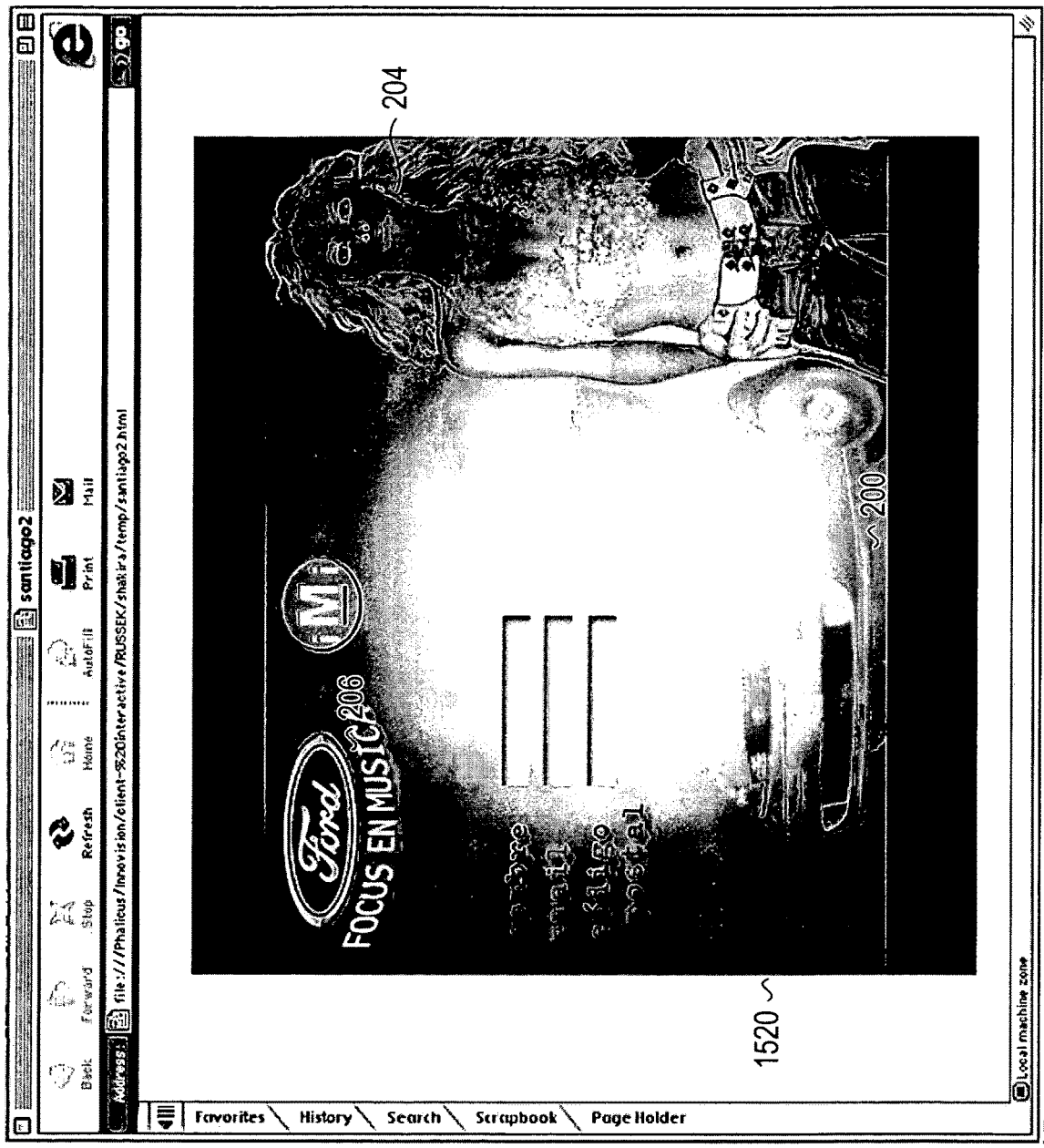
FIG. 15 illustrates a registration screen for an IMI.

FIG. 15 illustrates an exemplary registration screen of an IMI in which an audience member is presented with a log on window 1520 in order to view the IMI. In an embodiment, having the user log on creates the ability to either retrieve information about that user from the database or create a new entry in the database about the user.

FIG. 22A is a flow chart that illustrates an embodiment of the present system at work. A user may access a network or website at step 2200. The network or website may determine whether the user is a new user or a repeat user at step 2205. This check may include reviewing the user's cookies or simply asking the user to enter user identification (e.g. username and password). If the user is a repeat visitor, the user may be asked to input a user name and password at the login step 2210. The user profile may then be loaded into the system. If the user is a new user, a user profile may be created at step 2220. The created user profile may then be loaded into the system. In an embodiment, the created profile contains at least a username and a password. The profile optionally includes demographic data such as the user's gender, age, regional location and ethnic background.

At step 2230, the user may select a digital media presentation. As the digital media experience begins, the default digital media presentation may be presented for the user's viewing and/or listening pleasure. During the viewing of the digital media presentation, at step 2240 the trigger points 320 may be compared with the tags 1010 stored in the user's personal profile to determine if the default digital media asset video sequence 300 should be changed. If no tag 1010 is present for the tested trigger point, the digital media asset video sequence 300 may be viewed unchanged until the next trigger point 320. If a tag is present, the content of the digital media may be changed according to the stored user's personal profile 561.

In one example, an advertiser that manufactures various types of pet food, including dog food and cat food, forms an agreement with a record label that distributes music videos on the Internet for free viewing. A new music video of a popular artist may include a scene, segment or image having a dog or cat walk across the background to eat from a bowl of food or simply have a dog or cat graphic. Sitting next to the bowl of food is a bag labeled with one of the advertiser's brand name of pet food. Upon entering the website, the user's personal profile may be accessed. The profile may include information that the individual is a dog lover and/or dog owner. During playback of the video, a selection of the species of animal may be determined at the trigger point 320 based on the viewer's profile. For example, a tag 1010 in the profile may indicate to insert a dog into the video. Insertion of a dog into the media as opposed to a cat increases both the effectiveness of the advertising, by allowing the advertiser to highlight dog food to a dog lover, and the enjoyment of the video, since a dog lover is more likely to enjoy a music-based digital media experience featuring a dog. Thus, both the advertiser and the artist may benefit from the enhanced digital media being presented to viewers. Furthermore, the personal profile may further indicate a preferred breed of dog, such as golden retriever or terrier. If such information is specified, the specific breed of dog or cat may be inserted at the trigger point 320. The affinity of the user to the breed of animal may result in the user feeling more personally connected to the video.

Figure 16:
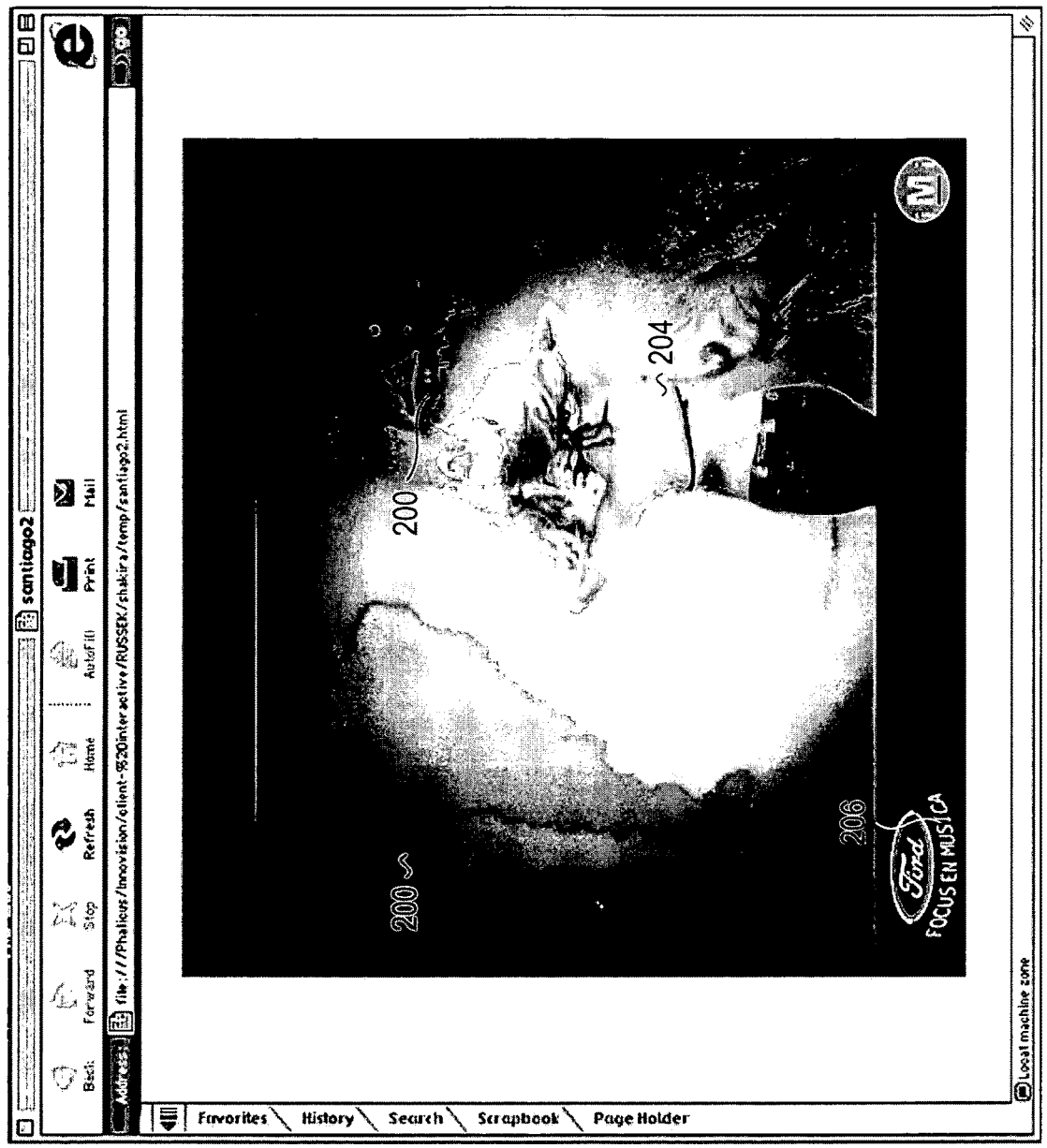
FIG. 16 illustrates a screen representing a personalized background in an IMI.

FIG. 16 illustrates exemplary digital media assets in the form of specialized background materials 200 illustrating one part of the world (the continent of South America) and background materials 200 including a woman's eye and face. In the event that it is determined from the user profile that the user has an appropriate (or positive) affinity for South America, this background may be selected for presentation. Similarly, the woman's eye (or eye color) and face (or hair color) may be selected if it is determined that they would create a better emotional experience for the user. By providing this material to that particular user an enhanced emotional experience may occur for the user.

Figure 17:
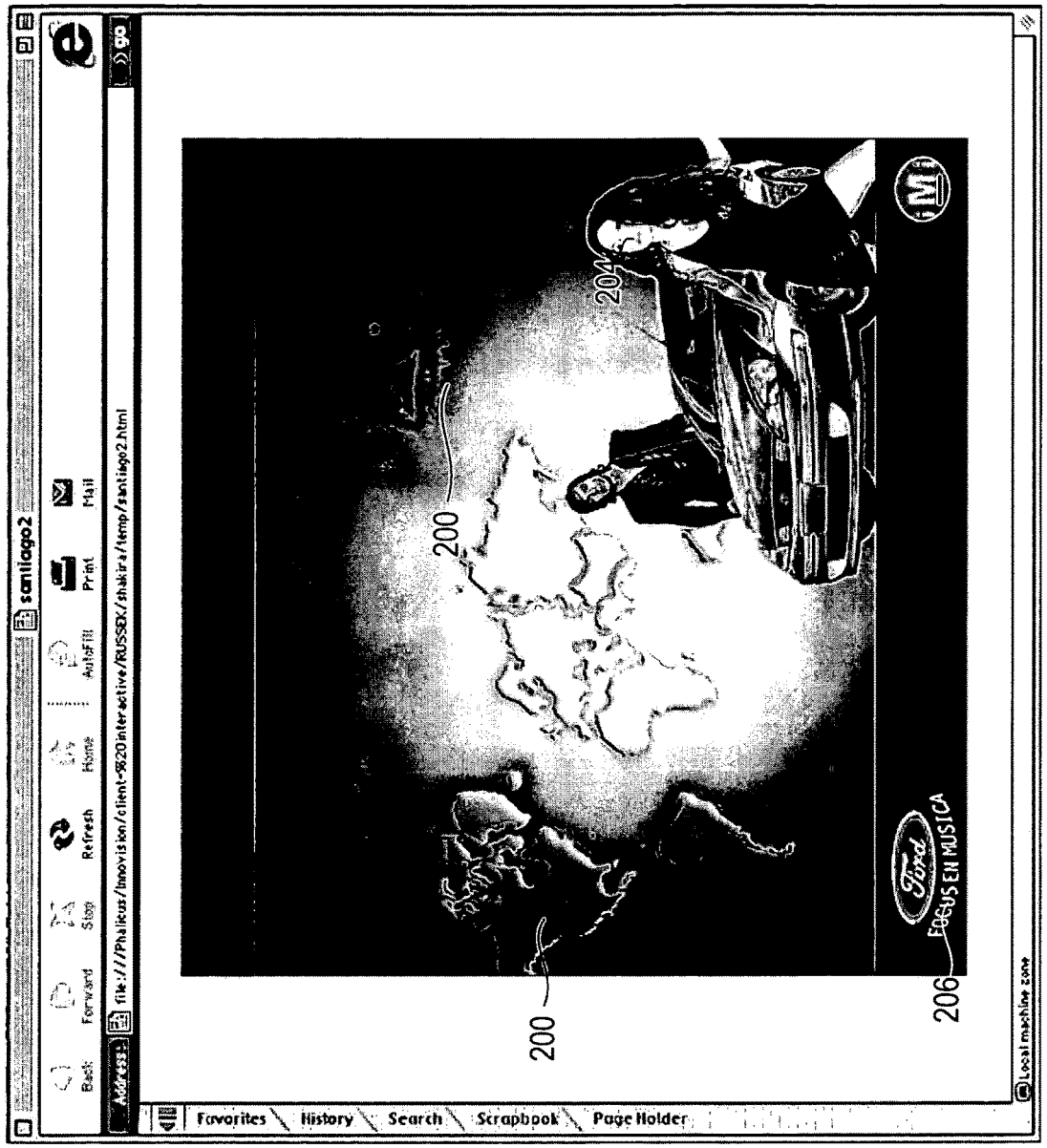
FIG. 17 illustrates a screen with personalized content in digital video form.

FIG. 17 illustrates a screen with personalized content in the form of digital media in which an automobile segment produced by the creative director 110 is shown on the screen along with a young man and a young woman. In one embodiment, these images are produced in conjunction with the audio, such that the user hears the artist's song and sees this specialized content and background material to create an emotionally enhanced experience. In one embodiment, the digital assets used to create the personalized digital media asset are selected based on the user profile and the ability to optimize the emotional experience for the user. These assets may include the make and/or color of the automobile, the ethnic background of the young man and young women, and even the color of the eye in the background.

Figure 18:
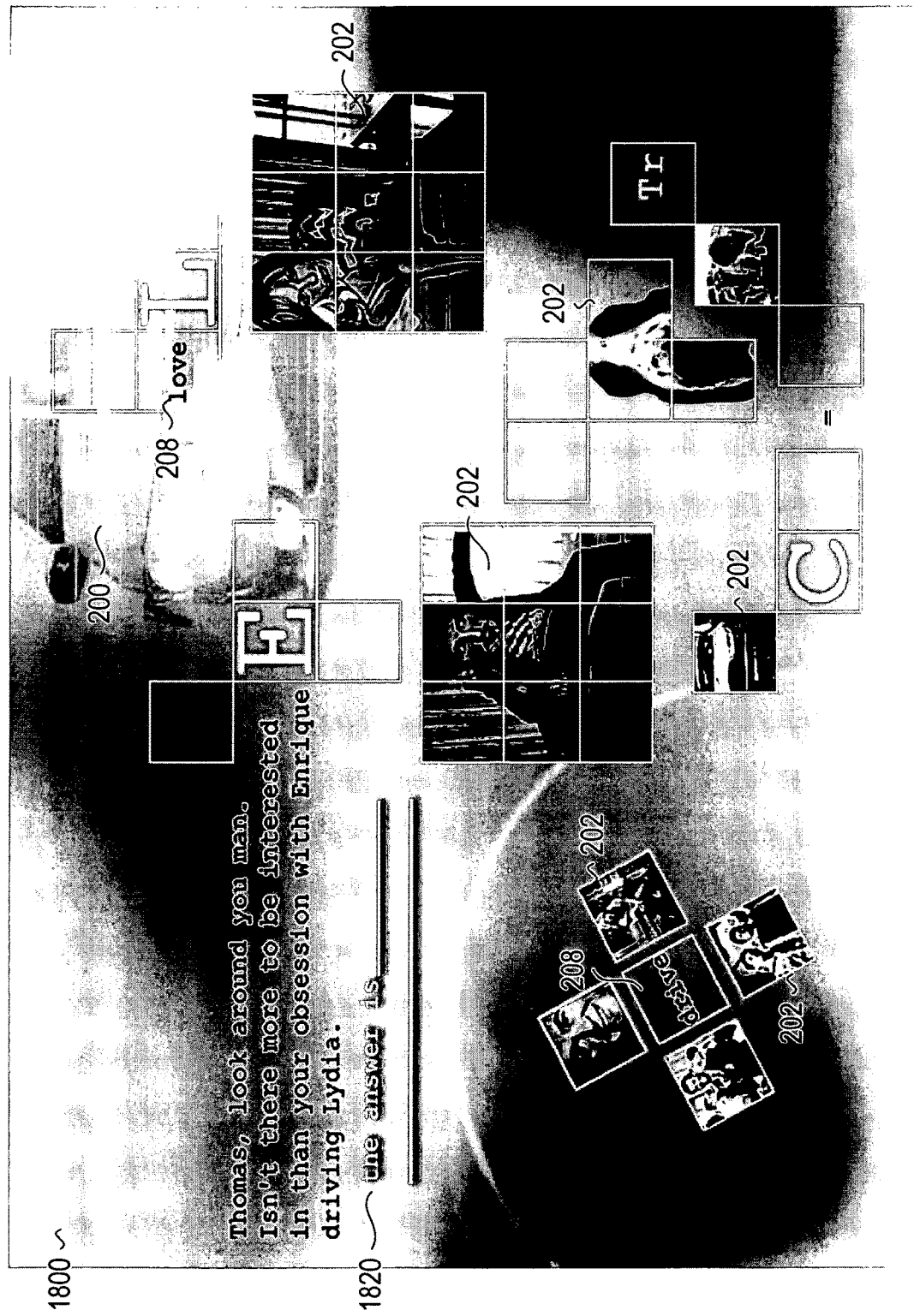
FIG. 18 illustrates a screen posing a question related to an IMI to a user.

FIG. 18 illustrates a screen posing a question relating to an IMI to a user. In this screen, the user is asked a question 1820 and can respond in textual form. The system may use the response to determine the user's perception of the IMI and consequently the user's preferences within the media narrative form. The system may further assess the user's potential affinity and add it to the user's profile.

Figure 19:
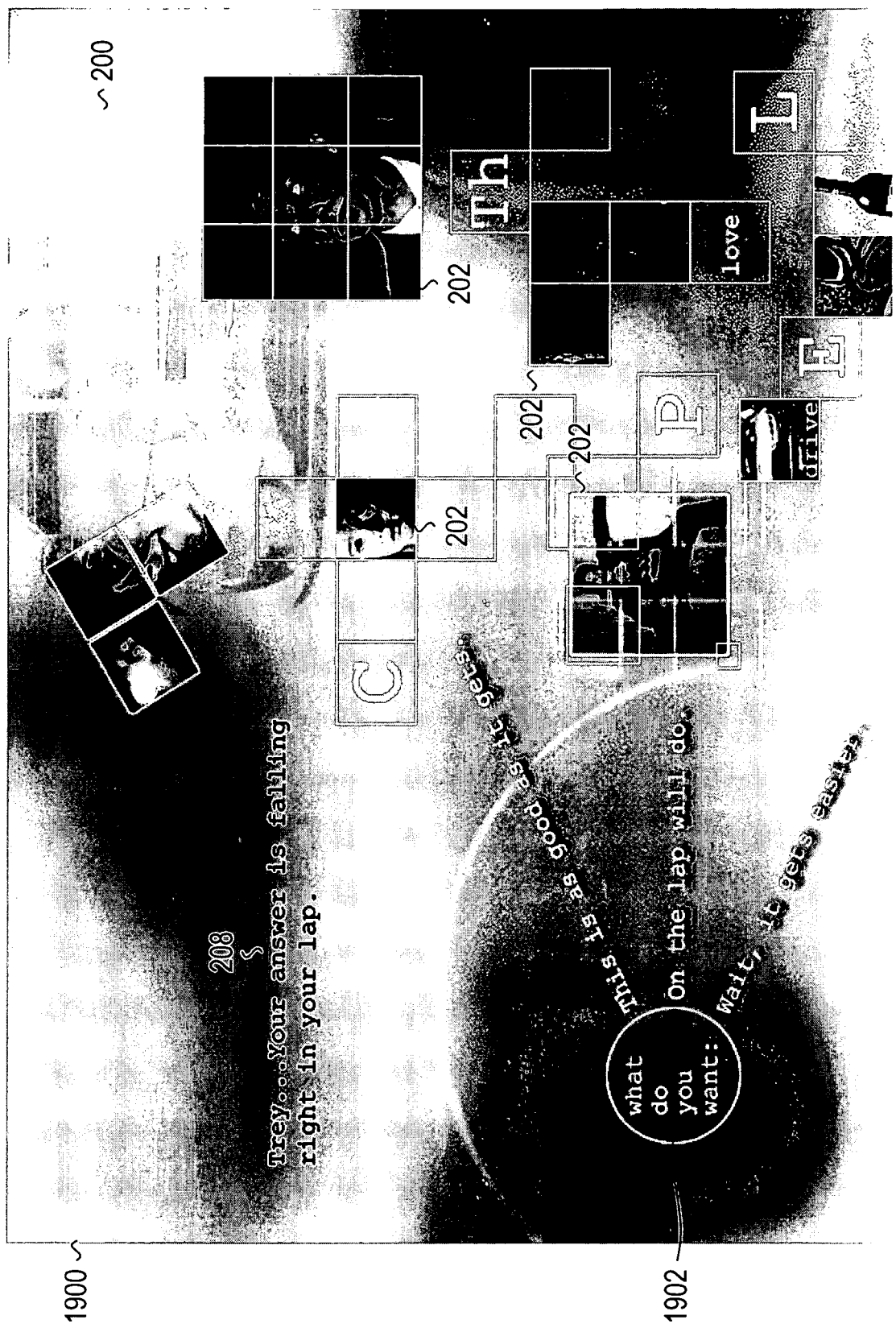
FIG. 19 illustrates a screen posing a multiple choice question related to an IMI to a user.

FIG. 19 illustrates a screen posing a multiple choice question 1902 relating to a media narrative experience. The user may respond to the question by selecting an answer. The selected answer may provide information to the system regarding the user's desires, preferred affinities and other internal narrative perceptual identification based attributes. In FIGS. 18 and 19, digital media assets are presented on the screen and may be customized according to the updated user's profile based upon the answers to those or previous questions posed to the user.

Figure 20:
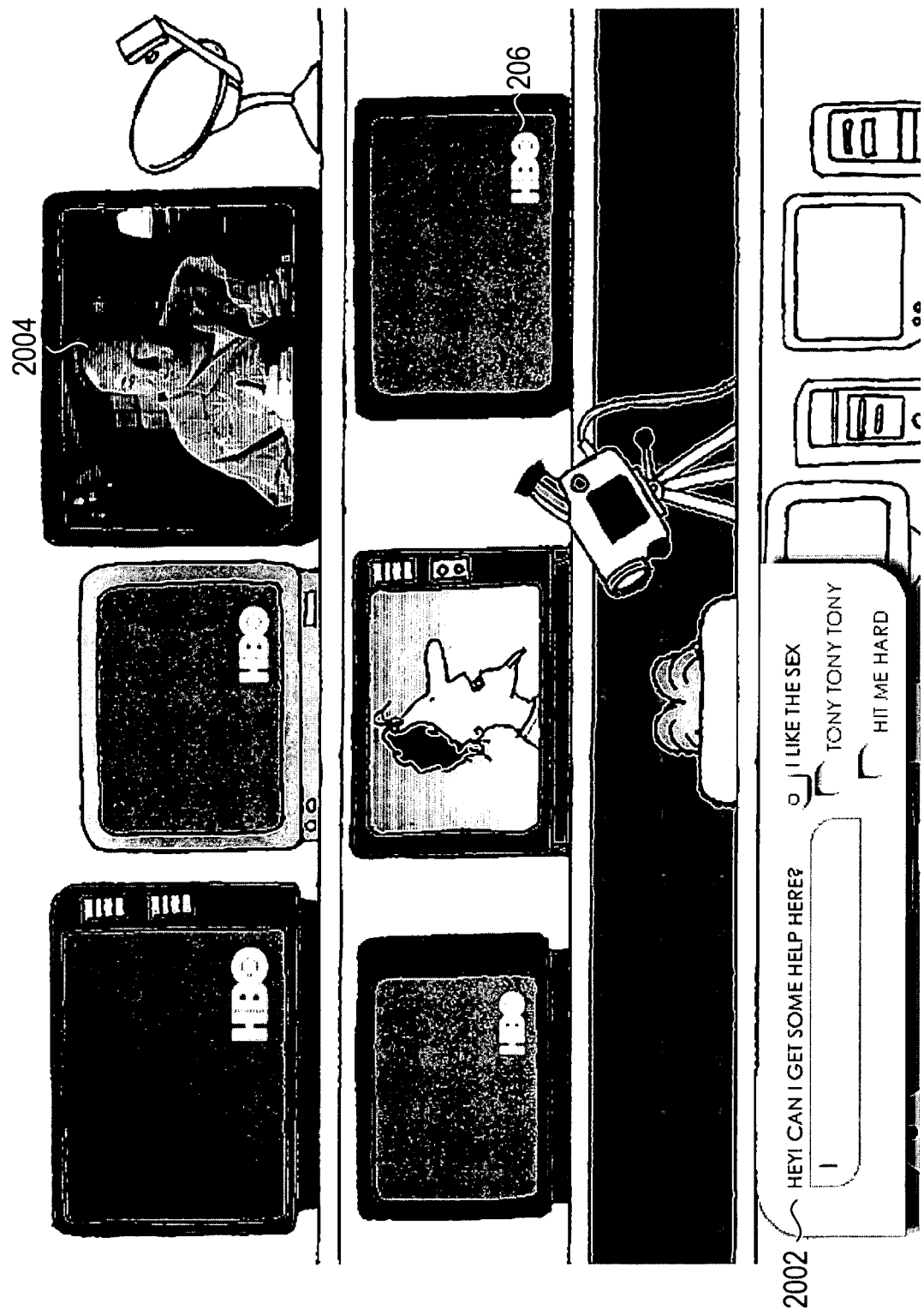
FIG. 20 illustrates an alternative screen for posing a question related to an IMI to a user.

FIG. 20 represents an alternative screen for posing questions 2002 within a digital media asset based experience to a user in which the user is asked to respond to a particular question and a particular character 2004, in this case from a TV series. Upon responding, the system may store information about the user and update the experience or presentation based on the current answer.

Figure 21:
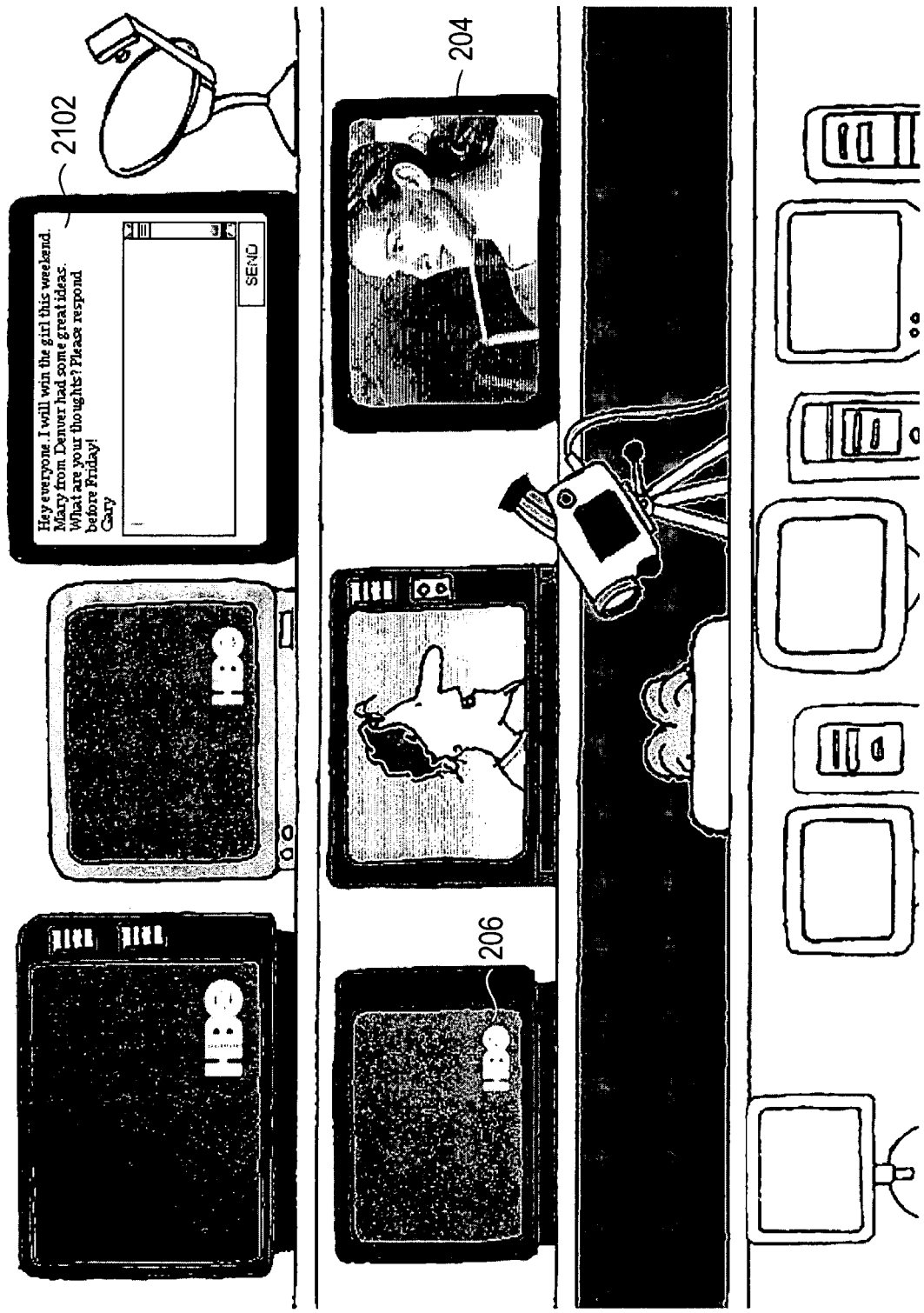
FIG. 21 illustrates a screen having a text communication window related to an IMI.

FIG. 21 illustrates a screen having a "chat type" window 2102 relating to an experience in which case the user can communicate with other users of the same experience. One advantage of this embodiment is that the users can share their comments on that experience with each other in either an anonymous or non-anonymous format. In another embodiment, users can simultaneously log on to an experience in a customized format. In this embodiment, the users can communicate with each other through a chat type window, e-mail, instant messenger, or other communication mechanism to discuss their emotional experience and put themselves into the story or the narrative experience. Such communication may allow users with higher social tendencies to have an enhanced experience and be more receptive to the sponsor's involvement as a result.

The screens of FIGS. 15-21 may be enhanced by operation of a fuzzy logic based Enhanced Director Agent. FIG. 22B illustrates an embodiment of the operation of a fuzzy logic based Enhanced Director Agent (EDA) for Digital Media Assets (DMA) "action" in a dynamically delivered digital media narrative platform. Audience interactions and/or inputs are normalized in step 2250 and the normalized inputs are stored in individual profile population files 2260. The profile population per individual may be used to evaluate inputs and to infer mixture of digital internal narrative perception identification framework profile elements, including internal narrative perception identification framework, per individual in step 2270 and sends this information to the digital asset evaluation step 2280. At step 2280, the creative director 110 evaluates the digital asset classification 2275 to infer a mixture of DMA asset preferences. This mixture may be used to form a priority of digital internal narrative perception identification framework profile elements at step 2285. At step 2290, the priority of DMA action is determined using the individual digital internal narrative perception identification framework profile. The DMA may include aspects such as audio, graphic, animation features, video features, the timing of the audio and/or video and any other transformable aspect of the DMA. At step 2295, the DMA action is set to correspond to each individual digital internal narrative perception identification framework profile according to the highest probability for personal preference and enhanced audience identification.

The DMA action may include changing any aspect of the digital media narrative that enhances the experience without destroying the integrity of the narrative experience. The action may include time sensitive changes, such as the changing of events, the playback speed, the timing of playback or the sequence of events such as changing the orientation of "scenes." The action may include changing the audio including the volume of playback, the score (i.e., the background music), the language spoken or even the accent of the speaker. The action may include changing the video aspect such as the gender, race or age of a character, the background scenery, the elements of the episode (e.g., a motorcycle, bicycle or horse is ridden), the color of clothing worn, an overcast or sunny sky, or any other visual aspect of the DMA. The invention is intended to cover any DMA actions that make the digital media asset video sequence 300 more connected to the viewer and enhance the experience.

In an embodiment, the DMA actions are logical and do not break the flow of a narrative or an episodic narrative. In other words, in an embodiment, a changed asset does not destroy the plotline of a story and does not introduce a character or element that has no logical reason for appearing in the frame. For example, in this embodiment, it would not be appropriate to change the background scenery to a cityscape if the character is shown wearing skis, conversely changing the background to a mountain while the main character is carrying shopping bags would destroy the flow of the DMA.

Another collaborative aspect may include enabling another user to control the digital media presented to the user. A first user may experience a digital media narrative that includes the aforementioned automatic enhancements and allows for personal selection of events/media content. The first user may enjoy the content so much that he or she wishes to share the experience with select friends, family or colleagues. The user may save the personalized digital media and enable selected individuals to share the experience by informing the system. The first user may set a security level for further sharing. A low security level may allow general access to the digital media narrative and enable secondary viewers to share the personalized digital media narrative with other viewers. A high security level may limit viewing of the digital media content to users having a direct relationship to the first viewer. A medium security level may limit access to viewers having either a direct link to the first viewer or an indirect connection, such as a friend-of-friend connection.

FIG. 23 illustrates a narrative perception identification framework that enables matching of digital media assets to individuals. The framework may be broken down into, for example, seven subsections: cognitive affinities, emotional affinities, social affinities, self-narrating self-maintaining content, internal narrative traits preference topology, time sensitive/episodic and expectation sequencing, and collective/collaborative. Each of these subsections may be assigned a value for a particular user. In an embodiment, cognitive affinities may be assigned a value defining whether an affinity is unknown or whether the person has a positive or negative affinity for a digital media asset. In an embodiment, unknown, low, medium, and high affinities may also be assigned to emotional and social affinities. In an embodiment, the self-narrating self-maintaining content may have no content, appropriate content, non-appropriate content, or the meaning of content that populates other fields. In an embodiment, time sensitive/episodic and expectation sequencing may determine whether the sequence aligns with cultural or psychological expectations, speed, motion variance and outcome variables for outcome expectations, and/or intent valencing and intent association. In an embodiment, the collective/collaborative subsection may determine whether the individual is socially connected with other users, the definition and relevance of such connections, and whether the individual prefers to receive content from others. The collective/collaborative subsection may include a determination of whether appropriate content or inappropriate content should be displayed.

It should be noted that the invention is not limited to viewing on a Personal Computer (PC) or laptop computer but is intended for use with any digital viewing or listening device. This includes, but is not limited to, televisions, Personal Digital Assistants (PDAs), wireless telephones, MP3 players and any other device utilized to view or listen to video and audio signals and that can carry on two way communications.

The many features and advantages of the invention are apparent from the detailed specification. Thus, the appended claims are intended to cover all such features and advantages of the invention which fall within the true spirits and scope of the invention. Further, since numerous modifications and variations will readily occur to those skilled in the art, it is not desired to limit the invention to the exact construction and operation illustrated and described. Accordingly, all appropriate modifications and equivalents may be included within the scope of the invention.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A system for personalized storytelling, the system comprising:
   a central processing unit (CPU); and
   a computer-readable storage medium operably connected to the CPU and comprising one or more programming instructions that, when executed, cause the CPU to:
   identify a first plurality of digital media assets,
   create a first composite digital story using the first plurality of digital media assets,
   wherein each of the first plurality of digital media assets is associated with a temporal location within the first composite digital story,
   play the first composite digital story on a display,
   retrieve a user profile for a user, the user profile containing a user attribute that indicates whether the user would respond favorably to a particular user-generated digital media asset,
   identify a plurality of user-generated digital media assets, wherein the plurality of user-generated digital media assets comprise matching user-generated digital media assets that match the user attribute and non-matching user-generated digital media assets that do not match the user attribute, and wherein each of the plurality of user-generated digital media assets includes a classification provided by a creator of each of the respective plurality of user-generated digital media assets,
   select a first and a second particular user-generated digital media asset from the plurality of user-generated digital media assets,
   determine, upon reaching the temporal location, whether the user would respond favorably to the first particular user-generated digital media asset based on the user attribute,
   execute a first operation to insert the first particular user-generated digital media asset into the first composite digital story based on the classification of the first particular user-generated digital media asset, only if it is determined that the user would respond favorably to the first particular user-generated digital media asset and if the first particular user-generated digital media asset is a matching user-generated digital media asset, the first operation resulting in a second composite digital story,
   or execute a second operation to insert the second particular user-generated digital media asset into the first composite digital story based on the classification of the second particular user-generated digital media asset, only if it is determined that the user would not respond favorably to the first particular user-generated digital media asset and if the first particular user-generated digital media asset is a non-matching user-generated digital media asset, the second operation resulting in a second composite digital story, and
   play the second composite digital story on the display,
   wherein, the CPU is configured to insert another matching user-generated digital media asset into the second composite digital story at each temporal location of the inserted first or second particular user-generated digital media asset, thereby creating a subsequent composite digital story,
   wherein the first composite digital story, the second composite digital story, and the subsequent composite digital story together form a user specific story, and
   wherein the user specific story has a different narrative than the first composite digital story.

* * * * *